US012425994B2

(12) United States Patent
Zhang et al.

(10) Patent No.: US 12,425,994 B2
(45) Date of Patent: Sep. 23, 2025

(54) TRANSMITTING SYNCHRONIZATION SIGNAL BLOCK VIA RECONFIGURABLE INTELLIGENT SURFACES

(71) Applicant: QUALCOMM Incorporated, San Diego, CA (US)

(72) Inventors: Yu Zhang, San Diego, CA (US); Hung Dinh Ly, San Diego, CA (US); Jinseok Choi, Austin, TX (US); Krishna Kiran Mukkavilli, San Diego, CA (US); Hwan Joon Kwon, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/042,590

(22) PCT Filed: Oct. 8, 2020

(86) PCT No.: PCT/CN2020/119863
§ 371 (c)(1),
(2) Date: Feb. 22, 2023

(87) PCT Pub. No.: WO2022/073161
PCT Pub. Date: Apr. 14, 2022

(65) Prior Publication Data
US 2023/0337158 A1    Oct. 19, 2023

(51) Int. Cl.
*H04W 56/00* (2009.01)
(52) U.S. Cl.
CPC .............................. *H04W 56/0015* (2013.01)

(58) Field of Classification Search
CPC .............. H04W 56/0015; H04W 48/12; H04B 7/04013; H04J 11/0073; H04J 11/0076; H04L 27/2613
See application file for complete search history.

(56) References Cited

U.S. PATENT DOCUMENTS 10,637,622 B2    4/2020  Lee et al.
11,265,197 B2 *  3/2022  Akkarakaran .... H04L 27/26136
                         (Continued)

FOREIGN PATENT DOCUMENTS

CN          110771081 A       2/2020
WO       WO-2019005613        1/2019
                         (Continued)

OTHER PUBLICATIONS

Elzanaty A., "Reconfigurable Intelligent Surfaces for Localization: Position and Orientation Error Bounds", arxiv.org, Cornell University Library, 201 Olin Library Cornell University Ithaca, NY 14853, Sep. 6, 2020, pp. 1-16., XP081756198, p. 1.
(Continued)

*Primary Examiner* — Ayaz R Sheikh
*Assistant Examiner* — Louis Samara
(74) *Attorney, Agent, or Firm* — Holland & Hart LLP

(57) ABSTRACT

Methods, systems, and devices for wireless communications are described. Generally, the described techniques provide for performing initial access procedures including transmitting or receiving synchronization signal blocks (SSBs) based on a capability of a user equipment (UE) to use reconfigurable intelligent surfaces (RISs). In some examples, a base station may transmit SSBs using two synchronization raster grids. For example, the base station may transmit SSBs on a first synchronization raster grid for UEs that do not support RISs and on a second synchronization raster grid for UEs that support RISs. In some examples, a base station may (Continued)

transmit different types of SSBs. For example, a base station may transmit a first type of SSB for UEs that do not support RISs and a second type of SSB for UEs that support RISs. A UE may search for and receive SSBs according to a capability of the UE.

30 Claims, 21 Drawing Sheets

(56) References Cited

U.S. PATENT DOCUMENTS

| | | | |
|---|---|---|---|
| 11,337,169 B2 * | 5/2022 | Jung | H04J 11/0069 |
| 11,533,118 B2 * | 12/2022 | Chiang | H04L 5/0007 |
| 2019/0215749 A1 | 7/2019 | Shih et al. | |
| 2020/0145944 A1 | 5/2020 | Kim et al. | |
| 2020/0280942 A1 | 9/2020 | Jung et al. | |
| 2022/0116821 A1 * | 4/2022 | Wei | H04B 7/15542 |
| 2023/0146103 A1 * | 5/2023 | Cheng | H04W 48/12 |
| | | | 370/252 |

FOREIGN PATENT DOCUMENTS

| | | | | |
|---|---|---|---|---|
| WO | WO-2019048483 A1 * | 3/2019 | ......... | H04L 27/2613 |
| WO | WO-2019157727 A1 | 8/2019 | | |
| WO | WO-2020055179 A1 | 3/2020 | | |

OTHER PUBLICATIONS

Ericsson: "NR System Sync Frequency Raster", 3GPP TSG-RAN WG1 Meeting #88, R1-1702121, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 7, 2017, pp. 1-6, XP051221031, paragraph [02.1].
Supplementary European Search Report—EP20956476—Search Authority—The Hague—Jun. 4, 2024.
International Search Report and Written Opinion—PCT/CN2020/119863—ISA/EPO—Jul. 19, 2021.
OPPO: "Discussion on Synchronization Raster Indication", 3GPP Draft, 3GPP TSG RAN WG1 Meeting AH 1801, R1-1800508, Vancouver, Canada, Jan. 22-26, 2018, 3 Pages.

* cited by examiner

TRANSMITTING SYNCHRONIZATION SIGNAL BLOCK VIA RECONFIGURABLE INTELLIGENT SURFACES

CROSS REFERENCE

The present Application is a 371 national stage filing of International PCT Application No. PCT/CN2020/119863 by ZHANG et al. entitled "TRANSMITTING SYNCHRONIZATION SIGNAL BLOCK VIA RECONFIGURABLE INTELLIGENT SURFACES," filed Oct. 8, 2020, which is assigned to the assignee hereof, and which is expressly incorporated by reference in its entirety herein.

FIELD OF TECHNOLOGY

The following relates to wireless communications, including transmitting one or more synchronization signal blocks via one or more reconfigurable intelligent surfaces.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support transmitting synchronization signal block (SSBs) via reconfigurable intelligent surfaces (RISs). Generally, the described techniques provide for performing initial access procedures including transmitting or receiving SSBs, which may include synchronization and system information along with other information, based on a capability of a UE to use RISs. In some examples, a base station may transmit SSBs using two synchronization raster grids. For example, the base station may transmit SSBs on a first synchronization raster grid for UEs that do not support RISs (e.g., legacy UEs) and on a second synchronization raster grid for UEs that support RISs. In some examples, a base station may transmit different types of SSBs. For example, a base station may transmit a first type of SSB for UEs that do not support RISs (e.g., legacy UEs) and a second type of SSB for UEs that support RISs. A UE may search for and receive SSBs according to a capability of the UE.

A method of wireless communications at a UE is described. The method may include identifying a first synchronization raster grid and a second synchronization raster grid for use by the UE to receive one or more synchronization signal blocks, the second synchronization raster grid including frequency positions associated with a reconfigurable intelligent surface, monitoring one or more resource elements (REs) for the one or more synchronization signal blocks based on one or more of the first synchronization raster grid or the second synchronization raster grid, and receiving at least one synchronization signal block based on monitoring the one or more resource elements.

An apparatus for wireless communications at a UE is described. The apparatus may include a processor, memory coupled with the processor, and instructions stored in the memory. The instructions may be executable by the processor to cause the apparatus to identify a first synchronization raster grid and a second synchronization raster grid for use by the UE to receive one or more synchronization signal blocks, the second synchronization raster grid including frequency positions associated with a reconfigurable intelligent surface, monitor one or more resource elements for the one or more synchronization signal blocks based on one or more of the first synchronization raster grid or the second synchronization raster grid, and receive at least one synchronization signal block based on monitoring the one or more resource elements.

Another apparatus for wireless communications at a UE is described. The apparatus may include means for identifying a first synchronization raster grid and a second synchronization raster grid for use by the UE to receive one or more synchronization signal blocks, the second synchronization raster grid including frequency positions associated with a reconfigurable intelligent surface, monitoring one or more resource elements for the one or more synchronization signal blocks based on one or more of the first synchronization raster grid or the second synchronization raster grid, and receiving at least one synchronization signal block based on monitoring the one or more resource elements.

A non-transitory computer-readable medium storing code for wireless communications at a UE is described. The code may include instructions executable by a processor to identify a first synchronization raster grid and a second synchronization raster grid for use by the UE to receive one or more synchronization signal blocks, the second synchronization raster grid including frequency positions associated with a reconfigurable intelligent surface, monitor one or more resource elements for the one or more synchronization signal blocks based on one or more of the first synchronization raster grid or the second synchronization raster grid, and receive at least one synchronization signal block based on monitoring the one or more resource elements.

In some examples of the method, apparatuses, and non-transitory computer-readable medium described herein, monitoring the one or more resource elements may include operations, features, means, or instructions for scanning one or more frequency positions in the first synchronization raster grid for the one or more synchronization signal blocks, failing to detect the one or more synchronization signal blocks at the one or more frequency positions in the first synchronization raster grid, and scanning one or more frequency positions in the second synchronization raster grid for the one or more synchronization signal blocks, where receiving the at least one synchronization signal block may be based on scanning the one or more frequency positions in the second synchronization raster grid.

In some examples of the method, apparatuses, and non-transitory computer-readable medium described herein, monitoring the one or more resource elements may include operations, features, means, or instructions for scanning one or more frequency positions in the first synchronization raster grid for the one or more synchronization signal blocks, where receiving the at least one synchronization signal block may be based on scanning the one or more frequency positions in the first synchronization raster grid.

Some examples of the method, apparatuses, and non-transitory computer-readable medium described herein may further include operations, features, means, or instructions for refraining from scanning one or more frequency positions in the second synchronization raster grid based on receiving the at least one synchronization signal block at the one or more frequency positions in the first synchronization raster grid.

Some examples of the method, apparatuses, and non-transitory computer-readable medium described herein may further include operations, features, means, or instructions for determining that a priority associated with the first synchronization raster grid may be different than a priority associated with the second synchronization raster grid, where monitoring the one or more resource elements may be based on the determining.

In some examples of the method, apparatuses, and non-transitory computer-readable medium described herein, determining that the priority associated with the first synchronization raster grid may be different than the priority associated with the second synchronization raster grid may include operations, features, means, or instructions for determining that the priority associated with the first synchronization raster grid may be higher than the priority associated with the second synchronization raster grid.

In some examples of the method, apparatuses, and non-transitory computer-readable medium described herein, determining that the priority associated with the first synchronization raster grid may be different than the priority associated with the second synchronization raster grid may include operations, features, means, or instructions for determining that the priority associated with the first synchronization raster grid may be lower than the priority associated with the second synchronization raster grid.

Some examples of the method, apparatuses, and non-transitory computer-readable medium described herein may further include operations, features, means, or instructions for receiving, from a base station, an indication of one of the first synchronization raster grid or the second synchronization raster grid that the UE may be to use for receiving the one or more synchronization signal blocks, where monitoring the one or more resource elements may be based on receiving the indication.

Some examples of the method, apparatuses, and non-transitory computer-readable medium described herein may further include operations, features, means, or instructions for receiving, from the base station, an indication that the second synchronization raster grid may be associated with the reconfigurable intelligent surface, where the UE uses one or both of the first synchronization raster grid or the second synchronization raster grid based on receiving the indication that the second synchronization raster grid may be associated with the reconfigurable intelligent surface and whether the UE may be capable of interacting with the reconfigurable intelligent surface.

In some examples of the method, apparatuses, and non-transitory computer-readable medium described herein, identifying the first synchronization raster grid and the second synchronization raster grid may include operations, features, means, or instructions for identifying a first set of frequency positions in the first synchronization raster grid and a second set of frequency positions in the second synchronization raster grid that may be non-overlapping with the first set of frequency positions in the first synchronization raster grid.

A method of wireless communications at a UE is described. The method may include identifying a first type of synchronization signal block and a second type of synchronization signal block that are associated with a same synchronization raster grid and are for receiving by the UE, where the second type of synchronization signal block is associated with a reconfigurable intelligent surface, monitoring one or more resource elements for the one or more synchronization signal blocks including one or more of the first type of synchronization signal block or the second type of synchronization signal block, and receiving at least one synchronization signal block of the first type or the second type based on monitoring the one or more REs.

An apparatus for wireless communications at a UE is described. The apparatus may include a processor, memory coupled with the processor, and instructions stored in the memory. The instructions may be executable by the processor to cause the apparatus to identify a first type of synchronization signal block and a second type of synchronization signal block that are associated with a same synchronization raster grid and are for receiving by the UE, where the second type of synchronization signal block is associated with a reconfigurable intelligent surface, monitor one or more resource elements for the one or more synchronization signal blocks including one or more of the first type of synchronization signal block or the second type of synchronization signal block, and receive at least one synchronization signal block of the first type or the second type based on monitoring the one or more REs.

Another apparatus for wireless communications at a UE is described. The apparatus may include means for identifying a first type of synchronization signal block and a second type of synchronization signal block that are associated with a same synchronization raster grid and are for receiving by the UE, where the second type of synchronization signal block is associated with a reconfigurable intelligent surface, monitoring one or more resource elements for the one or more synchronization signal blocks including one or more of the first type of synchronization signal block or the second type of synchronization signal block, and receiving at least one synchronization signal block of the first type or the second type based on monitoring the one or more REs.

A non-transitory computer-readable medium storing code for wireless communications at a UE is described. The code may include instructions executable by a processor to identify a first type of synchronization signal block and a second type of synchronization signal block that are associated with a same synchronization raster grid and are for receiving by the UE, where the second type of synchronization signal block is associated with a reconfigurable intelligent surface, monitor one or more resource elements for the one or more synchronization signal blocks including one or more of the first type of synchronization signal block or the second type of synchronization signal block, and receive at least one synchronization signal block of the first type or the second type based on monitoring the one or more REs.

In some examples of the method, apparatuses, and non-transitory computer-readable medium described herein, monitoring the one or more resource elements may include operations, features, means, or instructions for scanning a first frequency position in the synchronization raster grid for a synchronization signal block of the first type, failing to detect a synchronization signal block of the first type at the first frequency position, and scanning the first frequency position in the synchronization raster for a synchronization signal block of the second type, where receiving at least the one synchronization signal block may include operations, features, means, or instructions for receiving a synchronization signal block of the second type based on scanning the first frequency position.

In some examples of the method, apparatuses, and non-transitory computer-readable medium described herein, monitoring the one or more resource elements may include operations, features, means, or instructions for scanning each frequency position in the synchronization raster grid for a synchronization signal block of the first type, failing to detect a synchronization signal block of the first type at each frequency position in the synchronization raster grid, and scanning one or more frequency positions in the synchronization raster for a synchronization signal block of the second type, where receiving at least the one synchronization signal block may include operations, features, means, or instructions for receiving a synchronization signal block of the second type based on scanning the one or more frequency positions.

In some examples of the method, apparatuses, and non-transitory computer-readable medium described herein, monitoring the one or more resource elements may include operations, features, means, or instructions for scanning at least one frequency position in the synchronization raster grid for a synchronization signal block of the first type, where receiving at least the one synchronization signal block includes receiving a synchronization signal block of the first type based on scanning at least the one frequency position.

Some examples of the method, apparatuses, and non-transitory computer-readable medium described herein may further include operations, features, means, or instructions for determining that a priority associated with the first type of synchronization signal block may be different than a priority associated with the second type of synchronization signal block, where monitoring the one or more resource elements may be based on the determining.

In some examples of the method, apparatuses, and non-transitory computer-readable medium described herein, determining that the priority associated with the first type of synchronization signal block may be different than the priority associated with the second type of synchronization signal block may include operations, features, means, or instructions for determining that the priority associated with the first type of synchronization signal block may be higher than the priority associated with the priority associated with the second type of synchronization signal block.

In some examples of the method, apparatuses, and non-transitory computer-readable medium described herein, determining that the priority associated with the first type of synchronization signal block may be different than the priority associated with the second type of synchronization signal block may include operations, features, means, or instructions for determining that the priority associated with the first type of synchronization signal block may be lower than the priority associated with the priority associated with the second type of synchronization signal block.

In some examples of the method, apparatuses, and non-transitory computer-readable medium described herein, identifying the first type of synchronization signal block and the second type of synchronization signal block may include operations, features, means, or instructions for identifying a first location of a primary synchronization signal associated with the first type of synchronization signal block and a second location of a primary synchronization signal associated with the second type of synchronization signal block.

In some examples of the method, apparatuses, and non-transitory computer-readable medium described herein, identifying the first location and the second location may include operations, features, means, or instructions for identifying a first time location of a primary synchronization signal associated with the first type of synchronization signal block and a second time location of a primary synchronization signal associated with the second type of synchronization signal block.

In some examples of the method, apparatuses, and non-transitory computer-readable medium described herein, identifying the first type of synchronization signal block and the second type of synchronization signal block may include operations, features, means, or instructions for identifying a first mapping order of a secondary synchronization signal associated with the first type of synchronization signal block and a second mapping order of a secondary synchronization signal associated with the second type of synchronization signal block.

In some examples of the method, apparatuses, and non-transitory computer-readable medium described herein, identifying the first mapping order and the second mapping order may include operations, features, means, or instructions for identifying a first increasing mapping order of a secondary synchronization signal associated with the first type of synchronization signal block and a second decreasing mapping order of a secondary synchronization signal associated with the second type of synchronization signal block.

In some examples of the method, apparatuses, and non-transitory computer-readable medium described herein, identifying the first mapping order and the second mapping order may include operations, features, means, or instructions for identifying a first decreasing mapping order of a secondary synchronization signal associated with the first type of synchronization signal block and a second increasing mapping order of a secondary synchronization signal associated with the second type of synchronization signal block.

In some examples of the method, apparatuses, and non-transitory computer-readable medium described herein, the first mapping order and the second mapping order each include an order for mapping a sequence of symbols associated with a secondary synchronization signal onto one or more resource elements.

In some examples of the method, apparatuses, and non-transitory computer-readable medium described herein, identifying the first type of synchronization signal block and the second type of synchronization signal block may include operations, features, means, or instructions for identifying a first mapping order of a demodulation reference signal associated with the first type of synchronization signal block and a second mapping order of a demodulation reference signal associated with the second type of synchronization signal block.

In some examples of the method, apparatuses, and non-transitory computer-readable medium described herein, identifying the first mapping order and the second mapping order may include operations, features, means, or instructions for identifying a first increasing mapping order of a demodulation reference signal associated with the first type of synchronization signal block and a second decreasing mapping order of a demodulation reference signal associated with the second type of synchronization signal block.

In some examples of the method, apparatuses, and non-transitory computer-readable medium described herein, identifying the first mapping order and the second mapping order may include operations, features, means, or instructions for identifying a first decreasing mapping order of a demodulation reference signal associated with the first type of synchronization signal block and a second increasing mapping order of a demodulation reference signal associated with the second type of synchronization signal block.

In some examples of the method, apparatuses, and non-transitory computer-readable medium described herein, the first mapping order and the second mapping order each include an order for mapping a sequence of symbols associated with a demodulation reference signal onto one or more resource elements.

Some examples of the method, apparatuses, and non-transitory computer-readable medium described herein may further include operations, features, means, or instructions for receiving, from a base station, an indication of one of the first type of synchronization signal block or the second type of synchronization signal block, where monitoring the one or more resource elements may be based on receiving the indication.

In some examples of the method, apparatuses, and non-transitory computer-readable medium described herein, receiving the indication may include operations, features, means, or instructions for receiving a master information block from a base station including the indication.

A method of wireless communications at a base station is described. The method may include identifying a first synchronization raster grid and a second synchronization raster grid for use by the base station to transmit one or more synchronization signal blocks, the second synchronization raster grid including frequency positions associated with a reconfigurable intelligent surface, configuring one or more resource elements for transmitting the one or more synchronization signal blocks based on the first synchronization raster grid and second synchronization raster grid, and transmitting the one or more synchronization signal blocks using the one or more configured REs.

An apparatus for wireless communications at a base station is described. The apparatus may include a processor, memory coupled with the processor, and instructions stored in the memory. The instructions may be executable by the processor to cause the apparatus to identify a first synchronization raster grid and a second synchronization raster grid for use by the base station to transmit one or more synchronization signal blocks, the second synchronization raster grid including frequency positions associated with a reconfigurable intelligent surface, configure one or more resource elements for transmitting the one or more synchronization signal blocks based on the first synchronization raster grid and second synchronization raster grid, and transmit the one or more synchronization signal blocks using the one or more configured REs.

Another apparatus for wireless communications at a base station is described. The apparatus may include means for identifying a first synchronization raster grid and a second synchronization raster grid for use by the base station to transmit one or more synchronization signal blocks, the second synchronization raster grid including frequency positions associated with a reconfigurable intelligent surface, configuring one or more resource elements for transmitting the one or more synchronization signal blocks based on the first synchronization raster grid and second synchronization raster grid, and transmitting the one or more synchronization signal blocks using the one or more configured REs.

A non-transitory computer-readable medium storing code for wireless communications at a base station is described. The code may include instructions executable by a processor to identify a first synchronization raster grid and a second synchronization raster grid for use by the base station to transmit one or more synchronization signal blocks, the second synchronization raster grid including frequency positions associated with a reconfigurable intelligent surface, configure one or more resource elements for transmitting the one or more synchronization signal blocks based on the first synchronization raster grid and second synchronization raster grid, and transmit the one or more synchronization signal blocks using the one or more configured REs.

In some examples of the method, apparatuses, and non-transitory computer-readable medium described herein, configuring the one or more resource elements may include operations, features, means, or instructions for configuring resource elements at one or more frequency positions in the first synchronization raster grid, and configuring resource elements at one or more frequency positions in the second synchronization raster grid, where transmitting the one or more synchronization signal blocks may include operations, features, means, or instructions for transmitting the one or more synchronization signal blocks using the resource elements at the one or more frequency positions in the first synchronization raster grid and the resource elements at the one or more frequency positions in the second synchronization raster grid.

Some examples of the method, apparatuses, and non-transitory computer-readable medium described herein may further include operations, features, means, or instructions for transmitting, to one or more UEs, an indication of one of the first synchronization raster grid or the second synchronization raster grid for the UEs to use for receiving the one or more synchronization signal blocks, where configuring the one or more resource elements may be based on the indication.

In some examples of the method, apparatuses, and non-transitory computer-readable medium described herein, identifying the first synchronization raster grid and the second synchronization raster grid may include operations, features, means, or instructions for identifying a first set of frequency positions in the first synchronization raster grid and a second set of frequency positions in the second synchronization raster grid that may be non-overlapping with the first set of frequency positions in the first synchronization raster grid.

A method of wireless communications at a base station is described. The method may include identifying a first type of synchronization signal block and a second type of synchronization signal block that are associated with a same synchronization raster grid and for transmitting by the base station, where the second type of synchronization signal block is associated with a reconfiguration intelligent surface, configuring one or more resource elements for transmitting the one or more synchronization signal blocks including one or more of the first type of synchronization signal block or the second type of synchronization signal block, and transmitting the one or more synchronization signal blocks using the one or more configured resource elements.

An apparatus for wireless communications at a base station is described. The apparatus may include a processor, memory coupled with the processor, and instructions stored in the memory. The instructions may be executable by the processor to cause the apparatus to identify a first type of synchronization signal block and a second type of synchronization signal block that are associated with a same synchronization raster grid and for transmitting by the base station, where the second type of synchronization signal block is associated with a reconfiguration intelligent surface, configure one or more resource elements for transmitting the one or more synchronization signal blocks including one or more of the first type of synchronization signal block or the second type of synchronization signal block, and transmit the one or more synchronization signal blocks using the one or more configured resource elements.

Another apparatus for wireless communications at a base station is described. The apparatus may include means for identifying a first type of synchronization signal block and a second type of synchronization signal block that are associated with a same synchronization raster grid and for transmitting by the base station, where the second type of synchronization signal block is associated with a reconfiguration intelligent surface, configuring one or more resource elements for transmitting the one or more synchronization signal blocks including one or more of the first type of synchronization signal block or the second type of synchronization signal block, and transmitting the one or more synchronization signal blocks using the one or more configured resource elements.

A non-transitory computer-readable medium storing code for wireless communications at a base station is described. The code may include instructions executable by a processor to identify a first type of synchronization signal block and a second type of synchronization signal block that are associated with a same synchronization raster grid and for transmitting by the base station, where the second type of synchronization signal block is associated with a reconfiguration intelligent surface, configure one or more resource elements for transmitting the one or more synchronization signal blocks including one or more of the first type of synchronization signal block or the second type of synchronization signal block, and transmit the one or more synchronization signal blocks using the one or more configured resource elements.

Some examples of the method, apparatuses, and non-transitory computer-readable medium described herein may further include operations, features, means, or instructions for transmitting, to one or more UEs, an indication of one of the first type of synchronization signal block or the first type of synchronization signal block for which the UEs should monitor, where configuring the one or more resource elements may be based on the indication.

In some examples of the method, apparatuses, and non-transitory computer-readable medium described herein, transmitting the indication may include operations, features, means, or instructions for transmitting a master information block including the indication.

In some examples of the method, apparatuses, and non-transitory computer-readable medium described herein, identifying the first type of synchronization signal block and the second type of synchronization signal block may include operations, features, means, or instructions for identifying a first location of a primary synchronization signal associated with the first type of synchronization signal block and a second location of a primary synchronization signal associated with the second type of synchronization signal block.

In some examples of the method, apparatuses, and non-transitory computer-readable medium described herein, identifying the first location and the second location may include operations, features, means, or instructions for identifying a first time location of a primary synchronization signal associated with the first type of synchronization signal block and a second time location of a primary synchronization signal associated with the second type of synchronization signal block.

In some examples of the method, apparatuses, and non-transitory computer-readable medium described herein, identifying the first type of synchronization signal block and the second type of synchronization signal block may include operations, features, means, or instructions for identifying a first mapping order of a secondary synchronization signal associated with the first type of synchronization signal block and a second first mapping order of a secondary synchronization signal associated with the second type of synchronization signal block.

In some examples of the method, apparatuses, and non-transitory computer-readable medium described herein, identifying the first mapping order and the second mapping order may include operations, features, means, or instructions for identifying a first increasing mapping order of a secondary synchronization signal associated with the first type of synchronization signal block and a second decreasing mapping order of a secondary synchronization signal associated with the second type of synchronization signal block.

In some examples of the method, apparatuses, and non-transitory computer-readable medium described herein, identifying the first mapping order and the second mapping order may include operations, features, means, or instructions for identifying a first decreasing mapping order of a secondary synchronization signal associated with the first type of synchronization signal block and a second increasing mapping order of a secondary synchronization signal associated with the second type of synchronization signal block.

In some examples of the method, apparatuses, and non-transitory computer-readable medium described herein, the first mapping order and the second mapping order each include an order for mapping a sequence of symbols associated with a secondary synchronization signal onto one or more resource elements.

In some examples of the method, apparatuses, and non-transitory computer-readable medium described herein, identifying the first type of synchronization signal block and the second type of synchronization signal block may include operations, features, means, or instructions for identifying a first mapping order of a demodulation reference signal associated with the first type of synchronization signal block and a second mapping order of a demodulation reference signal associated with the second type of synchronization signal block.

In some examples of the method, apparatuses, and non-transitory computer-readable medium described herein, identifying the first mapping order and the second mapping order may include operations, features, means, or instructions for identifying a first increasing mapping order of a demodulation reference signal associated with the first type of synchronization signal block and a second decreasing mapping order of a demodulation reference signal associated with the second type of synchronization signal block.

In some examples of the method, apparatuses, and non-transitory computer-readable medium described herein, identifying the first mapping order and the second mapping order may include operations, features, means, or instructions for identifying a first decreasing mapping order of a demodulation reference signal associated with the first type of synchronization signal block and a second increasing mapping order of a demodulation reference signal associated with the second type of synchronization signal block.

In some examples of the method, apparatuses, and non-transitory computer-readable medium described herein, the first mapping order and the second mapping order each include an order for mapping a sequence of symbols associated with a secondary synchronization signal onto one or more resource elements.

DETAILED DESCRIPTION

Figure 1:
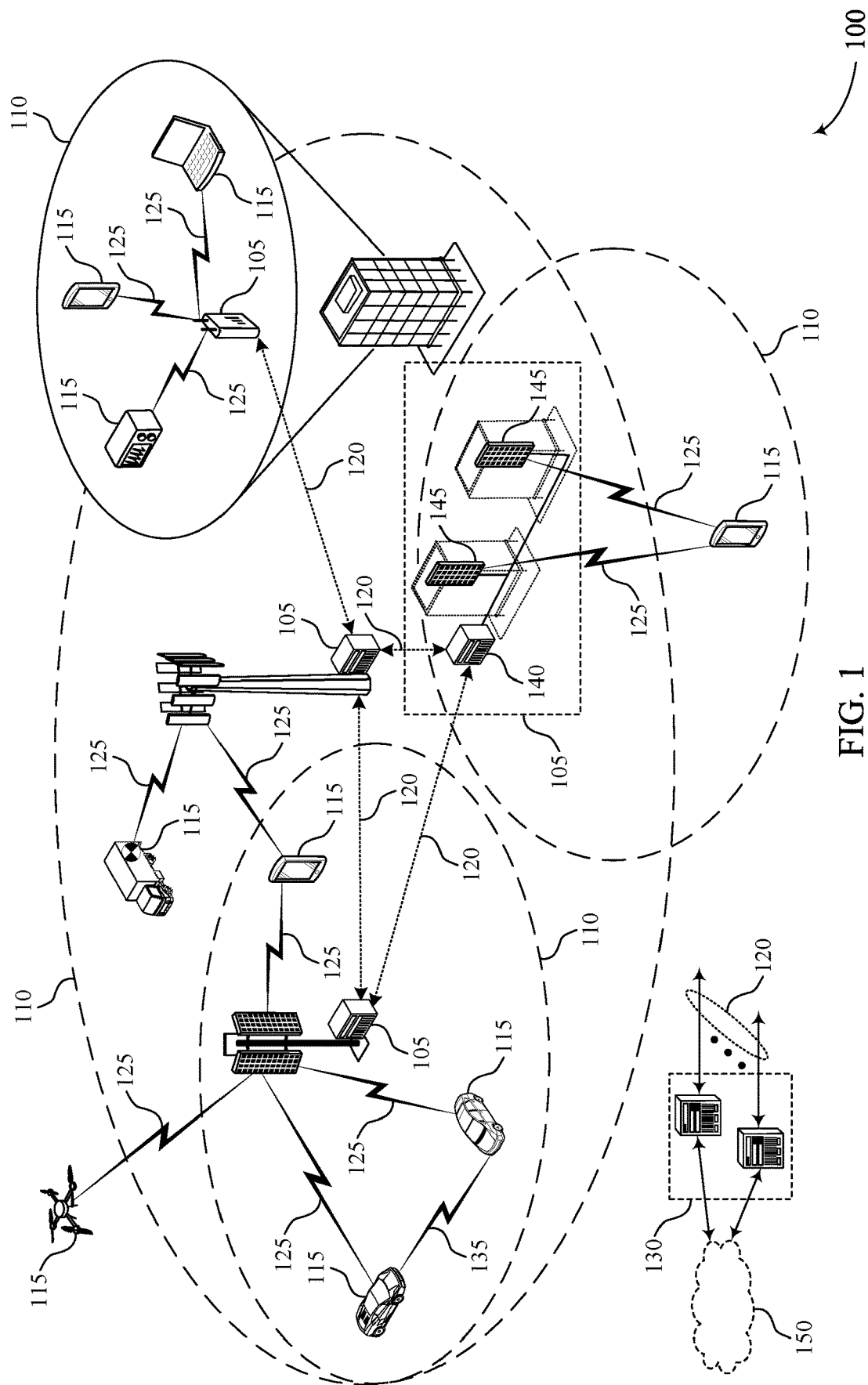
FIG. 1 illustrates an example of a wireless communications system that supports transmitting one or more synchronization signal blocks via one or more reconfigurable intelligent surfaces in accordance with aspects of the present disclosure.

Some wireless communications systems, such as fifth generation (5G) New Radio (NR) systems, may include reconfigurable intelligent surfaces (RISs) to extend wireless communications coverage. For example, a wireless communications system may employ an RIS to extend communications coverage around, or because of, blockages with negligible power consumption costs. The RIS may extend coverage by reflecting one or more directional beams transmitted by a base station around blockages such that the base station may serve one or more user equipments (UEs) even if there is an obstructed path or channel between the UEs and the base station. In some examples, wireless communications systems that support using RISs may have UEs that support the use of RISs and UEs that do not support the use of RISs (e.g., legacy UEs, non-RIS UEs). Accordingly, a base station may use different initial access procedures for each type of UE (e.g., RIS UEs or non-RIS UEs) and may use a method by which the base station and a UE may know whether an RIS can be used or is being used.

Some methods for providing different initial access procedures may include methods for a base station to transmit synchronization signal blocks (SSBs), which may include synchronization and system information along with other information. In some examples, a base station may transmit SSBs using two different synchronization raster grids. For example, a base station may transmit SSBs using a first synchronization raster grid for UEs that do not support using RISs (e.g., legacy UEs, non-RIS UEs) and a second synchronization raster grid for UEs that support or are using RISs. Each type of UE may search for and receive SSBs at frequency positions in the first synchronization raster grid or the second synchronization raster grid according to a capability of the UE (e.g., a capability of the UE to communicate based on one or more RISs). For example, a UE using an RIS may search for and fail to detect SSBs at frequency positions in the first raster grid, potentially due to an existence of an obstructed path or channel between the UE and a base station. In response to failing to detect any SSBs, the UE may search frequency positions in the second raster grid and may receive an SSB accordingly.

In some examples, a base station may transmit two types of SSBs on a same synchronization raster grid. For example, a base station may transmit a first type of SSB for UEs that do not support using RISs and a second type of SSB for UEs that support or are using RISs. Each type of UE may search for and receive SSBs of the first type or the second type according to a capability of the UE. For example, a UE that supports or is using an RIS may search for and fail to detect SSBs of the first type at each frequency position (or at least some of the frequency positions) in the synchronization raster grid. In response to failing to detect an SSB of the first type, the UE may monitor (e.g., scan) the synchronization raster grid for SSBs of the second type and receive at least one SSB accordingly. In some implementations, the two types of SSB may be distinguished by, for example, a location of a primary synchronization signal (PSS), a mapping order of a secondary synchronization signal (SSS), a mapping order of a demodulation reference signal (DMRS) associated with a physical broadcast channel (PBCH), one or more other factors, or any combination thereof. In some examples, implementing one or more aspects of the present disclosure may enable a base station and UE to perform an initial access procedure based on whether an RIS is being used and whether the UE supports the RIS, and may enable the UE to receive one or more SSBs according to its capability.

Aspects of the disclosure are initially described in the context of wireless communications systems. Aspects of the disclosure are further described in the context of process flows and resource mapping schemes. Aspects of the disclosure are further illustrated by and described with reference to apparatus diagrams, system diagrams, and flowcharts that relate to transmitting SSB via RISs.

FIG. 1 illustrates an example of a wireless communications system 100 that supports transmitting one or more SSBs via one or more RISs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Due to obstructions or blockages, the wireless communications system 100 may include RISs to extend communications coverage. For example, the wireless communications system 100 may use an RIS to reflect directional beams transmitted by a base station 105 such that the bae station 105 may serve one or more UEs experiencing an obstructed path or channel. If the wireless communications system 100 supports using RISs, base stations 105 may perform different initial access procedures with UEs 115 based on whether the UEs 115 supports RISs. Such procedures may include a base station 105 transmitting SSBs to accommodate one or more UEs 115 that support RISs and one or more UEs 115 that do not support RISs. For example, a base station 105 may transmit one or more SSBs on different synchronization raster grids for the different types of UEs 115. Additionally or alternatively, a base station 105 may transmit different types of SSBs. UEs 115 may search for and receive one or more SSBs according to their capabilities, including their capability to support RISs, among other factors.

Figure 2:
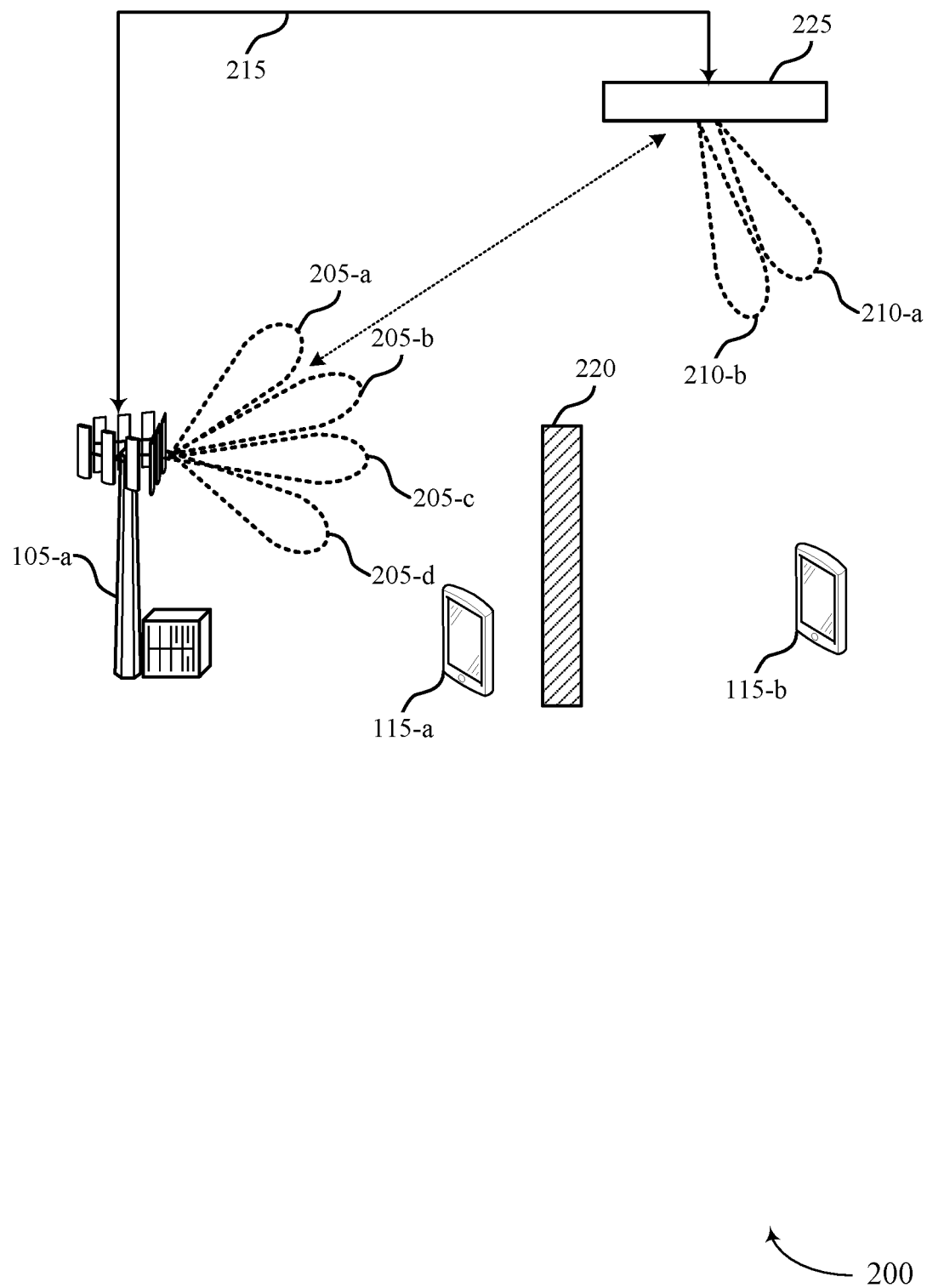
FIG. 2 illustrates an example of a wireless communications system that supports transmitting one or more synchronization signal blocks via one or more reconfigurable intelligent surfaces in accordance with aspects of the present disclosure.

FIG. 2 illustrates an example of a wireless communications system 200 that supports transmitting one or more SSBs via one or more RISs in accordance with one or more aspects of the present disclosure. In some examples, the wireless communications system 200 may be implemented by or may implement aspects of the wireless communications system 100 as described with reference to FIG. 1. The wireless communications system 200 may include a UE 115-*a* and a UE 115-*b* which may be examples of the UE 115 as described with reference to FIG. 1. The wireless communications system 200 may also include a base station 105-*a* which may be an example of the base station 105 as described with reference to FIG. 1. In some examples, the base station 105-*a* may communicate with the UE 115-*a* or the UE 115-*b* using directional communications techniques. For example, the base station 105-*a* may communicate with the UE 115-*a* or the UE 115-*b* via one or more beams 205.

The UEs 115-*a* or UE 115-*b* may perform an initial access procedure to establish a connection with the base station 105-*a*. Some initial access procedures may include the UE 115-*a* or the UE 115-*b* (or both) acquiring synchronization and system information from the base station 105-*a* via one or more SSBs, for example, sent on a PBCH. For example, the base station 105-*a* may transmit (e.g., broadcast) one or more SSBs associated with the beams 205. In some implementations, the base station 105-*a* may transmit SSBs for each beam 205 using time division multiplexing techniques or using different frequency positions defined by a synchronization raster grid. The UE 115-*a* or the UE 115-*b* (or both) may receive at least one SSB based on which of the beams 205 UE 115-*a* or the UE 115-*b* (or both) monitor. For example, the UE 115-*a* may receive an SSB using the beam 205-*d*, but may not monitor any of the beams 205-*a*, 205-*b*, or 205-*c*.

In some examples, one or more beams 205 may be obstructed by a blockage 220 such that the base station 105-*a* may be unable to establish a connection with the UE 115-*b*. To mitigate the effects of the blockage 220, the wireless communications system 200 may include an RIS 225. The RIS 225 may reflect one or more beams 205 used by the base station 105-*a*. For example, the base station 105-*a* may transmit information using a beam 205-*a*, a beam 205-*b*, a beam 205-*c*, or a beam 205-*d*. In some examples, the beams 205-*c* and 205-*d* may be obstructed by the blockage 220 and so may not be used by the base station 105-*a* to communicate with the UE 115-*b*. The beams 205-*a* and 205-*b*, however, may not be obstructed by the blockage 220, but rather may be reflected by the RIS 225 to create a reflected beam 210-*a* and a reflected beam 210-*b*. The reflected beams 210-*a* and 210-*b* may bypass the blockage 220 and so may be used by the base station 105-*a* to communicate with the UE 115-*b*. In some examples, the base station 105-*a* may communicate with the RIS 225 via a link 215. In some implementations the link 215 may be unidirectional where the base station 105-*a* may communicate with the RIS 225 or the link 215 may be bi-directional where the RIS 225 may also communicate with the base station 105-*a*. Accordingly, the base station 105-*a* may adjust a set of phase weights, position, orientation, other factor, or any combination thereof of the RIS 225 to change a reflection direction of one or more beams 205. In some implementations, the RIS 225 may be an example of a near-passive device that exhibits a relatively low power consumption.

In such cases where the wireless communications system 200 uses the RIS 225, a path or channel between the base station 105-*a* and the UE 115-*b* may be different from a path or channel between the base station 105-*a* and the UE 115-*a*. For example, a path or channel between the UE 115-*b* and the base station 105-*a* may include the RIS 225 while a path or channel between the UE 115-*a* and the base station 105-*a* may be direct. Due to an existence of different paths or channels, an initial access procedure performed by the base station 105-*a* and the UE 115-*a* may be different from an initial access procedure performed by the base station 105-*a* and the UE 115-*b*. For example, the base station 105-*a* and the UE 115-*a* or the UE 115-*b* may differentiate an SSB received by the UE 115-*a* and an SSB received by the UE 115-*b* as part of one or more initial access procedures.

In some examples, the base station 105-*a* may transmit SSBs using frequency positions defined by multiple synchronization raster grids. For example, the base station 105-*a* may transmit SSBs at frequency positions defined by a first synchronization raster grid for use by the UE 115-*a* and may transmit SSBs at frequency positions defined by a second synchronization raster grid for use by the UE 115-*b*. In some implementations, the first synchronization raster grid and the second synchronization raster grid may be different, for example, non-overlapping such that a frequency position used in the first synchronization raster grid is not used in the second synchronization raster grid. Although described with reference to the UE 115-*a* and the UE 115-*b* herein, SSBs transmitted using the first and second synchronization raster grids may not be unique to the UE 115-*a* or the UE 115-*b*, but rather may be received by any number of UEs 115 using a channel similar to one of the channels used by the UE 115-*a* or the UE 115-*b*. In some implementations, the base station 105-*a* may send an indication to the UE 115-*a* or the UE 115-*b* indicating a synchronization raster grid to monitor for SSBs. By transmitting SSBs using two synchronization raster grids, the base station 105-*a* may enable the UE 115-*a* and the UE 115-*b* to determine whether a connection established with the base station 105-*a* uses the RIS 225 and to receive one or more SSBs that may include synchronization and system information, among other advantages.

In some examples, the base station 105-*a* may transmit two types of SSBs. For examples, the base station 105-*a* may transmit SSBs of a first type for use by the UE 115-*a* and may transmit SSBs of a second type for use by the UE 115-*b*. In some implementations, the base station 105-*a*, the UE 115-*a*, or the UE 115-*b* may differentiate the first type of SSB from the second type by, for example, a location (e.g., in a time location, in a frequency location) or ordering of synchronization of reference signals associated with SSBs.

In some implementations, the base station 105-*a* may send a message (e.g., a message that may include a master information block (MIB)) to the UE 115-*a* or the UE 115-*b* (or both) indicating a type of SSB to use. For example, the base station 105-*a* may transmit an indication in a MIB where one value (e.g., a bit value of 0) indicates one type of SSB (e.g., a first type) and a different value (e.g., a bit value of 1) indicates another other type of SSB (e.g., a second type). Additionally or alternatively to other techniques described herein, the UE 115-*a* or the UE 115-*b* (or both) may differentiate the types of SSB or may select a type of SSB to use based on receiving the indication. In some implementations, the indication may include any number of bits corresponding to a number of types of SSBs (e.g., may indicate one, two, or more types of SSBs).

Although described with reference to the UE 115-*a* and the UE 115-*b*, the two types of SSBs may not be unique to the UE 115-*a* or the UE 115-*b*, but rather may be used by any number of UEs 115 using a path or a channel similar to one of the channels used by the UE 115-*a* or the UE 115-*b* (or both). By transmitting two types of SSBs, the base station 105-a may enable the UE 115-a or the UE 115-b to determine whether a connection established with the base station 105-a uses the RIS 225 and to receive one or more SSBs that may include synchronization and system information, among other advantages. Implementing one or more aspects of the present disclosure may enable the wireless communications system 200 to support both connections between base stations 105 and UEs 115 that support using the RIS 225 and connections between base stations 105 and UEs 115 that do not support using the RIS 225.

Figure 3:
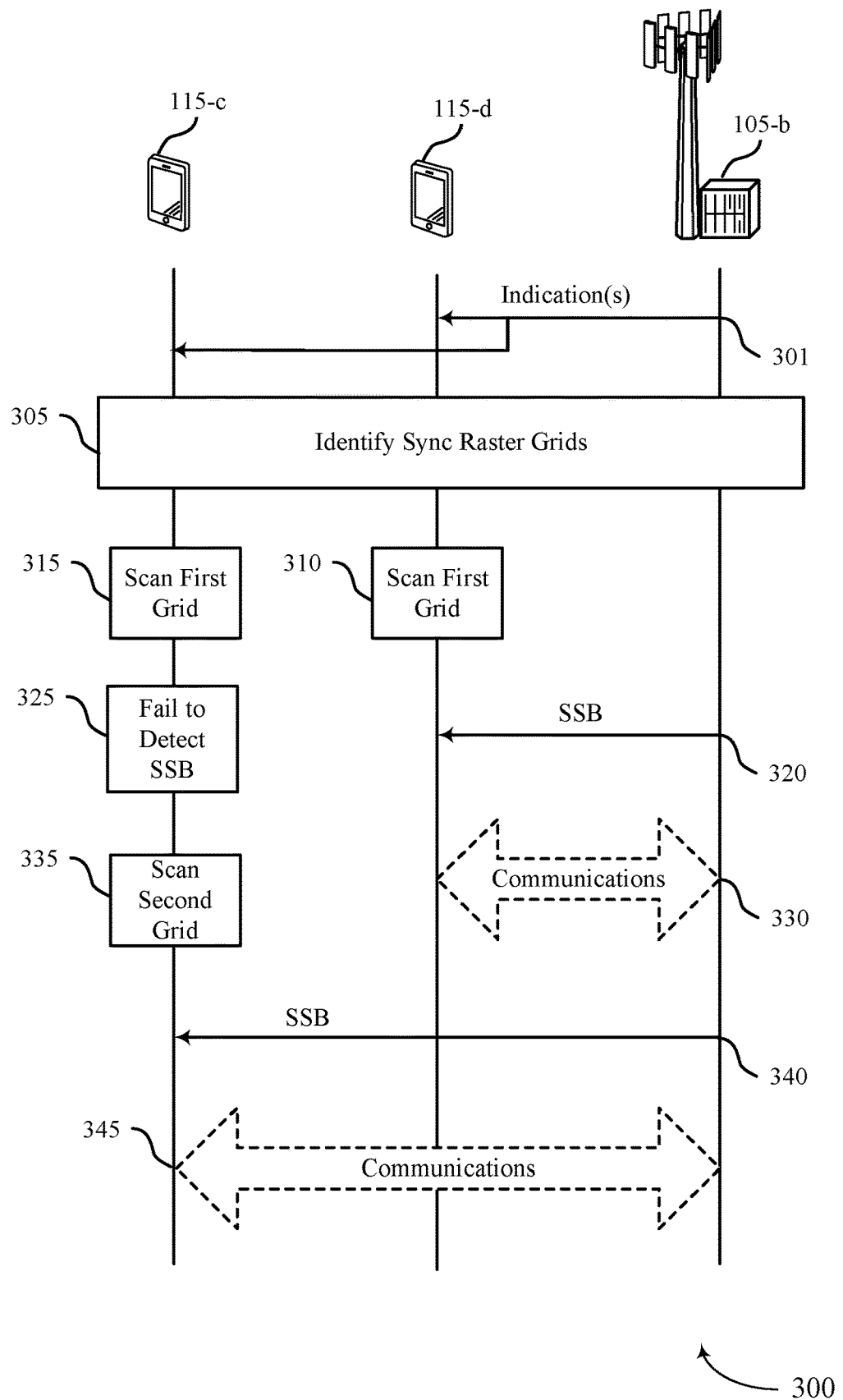
FIG. 3 illustrates an example of a process flow that supports transmitting one or more synchronization signal blocks via one or more reconfigurable intelligent surfaces in accordance with aspects of the present disclosure.

FIG. 3 illustrates an example of a process flow 300 that supports transmitting one or more SSBs via one or more RISs in accordance with one or more aspects of the present disclosure. In some examples, the process flow 300 may be implemented by or may implement aspects of the wireless communications system 100 or 200 as described with reference to FIGS. 1 and 2. The process flow 300 may include a UE 115-c, a UE 115-d, and a base station 105-b, which may be examples of the corresponding devices as described herein. In some examples, the UE 115-c may experience an obstructed path or channel between the UE 115-c and the base station 105-b and the UE 115-d may experience an unobstructed path or channel between the UE 115-d and the base station 105-b. Accordingly, the UE 115-c may be an example of a UE 115 that supports using an RIS for communication with the base station 105-b. Similarly, the UE 115-d may be an example of a UE 115 (e.g., a legacy UE 115) that does not support using an RIS. Alternative examples of the following may be implemented where some processes are performed in a different order than described or not performed at all. In some implementations, processes may include additional features not mentioned below, or further processes may be added In some examples, such as if the UE 115-c or the UE 115-d (or both) is operating in a connected mode (e.g., an radio resource control (RRC) connected mode), at 301, the base station 105-b may transmit one or more indications to the UE 115-c or the UE 115-d (or both). When one or both of the UE 115-c or the UE 115-d is in an RRC idle mode, the base station 105-b may not transmit one or more indications to the UE 115-c or the UE 115-d (or both) at 301. In some implementations, the base station 105-b may transmit an indication of a synchronization raster grid that the UE 115-c or UE 115-d (or both) is to use for receiving an SSB. For example, the base station 105-b may indicate the UE 115-c to search the first or second synchronization raster grid for an SSB. Additionally or alternatively, the base station 105-b may transmit an indication that the second synchronization raster grid is to use for receiving an SSB when one or more RISs is being used. The UE 115-c or the UE 115-d (or both) may determine to search the first or second synchronization raster grid based on receiving the indication that the second synchronization raster grid is associated with an RIS. In some examples, the base station 105-b may not transmit the indications if the UE 115-c or the UE 115-d (or both) is operating in an idle mode (e.g., RRC non-connected or idle mode).

At 305, the UE 115-c, the UE 115-d, and the base station 105-b may identify a first synchronization raster grid and a second synchronization raster grid for transmitting or receiving SSBs. In some implementations, the first synchronization raster grid (i.e., Raster 0) may be used by UEs 115 that experience an unobstructed channel between the UEs 115 and a base station 105. Similarly, the second raster grid (i.e., Raster 1) may be used by UEs 115 that may use an RIS to establish connection with a base station 105 in the presence of an obstructed path or channel between the UEs 115 and the base station 105. In some implementations, the UE 115-c may be capable or configured to use both the first and second synchronization raster grids, but the UE 115-d may capable or configured to use only the first synchronization raster grid. In some implementations the first and second synchronization raster grids may be non-overlapping such that if a frequency position is used in the first synchronization raster grid then the same frequency position is not used in the second synchronization raster grid. In some implementations, the first and second synchronization raster grids may be pre-configured such that the UEs 115 may have the first and second synchronization raster grids stored or otherwise able to be referenced. In some implementations, a base station 105 may transmit (e.g., broadcast) SSBs on one or both synchronization raster grids.

At 310, the UE 115-d may scan (e.g., monitor) one or more frequency positions in the first synchronization raster grid for an SSB. Similarly, at 315, the UE 115-c may scan one or more frequency positions in the first synchronization raster grid. In some examples, the UE 115-c or the UE 115-d (or both) may search some or all of the frequency positions in the first synchronization raster grid. For example, the UE 115-c or the UE 115-d (or both) may search a subset of the frequency positions in the raster grid based on a pattern. In some examples, the UEs 115-c or the UE 115-d (or both) may search frequency positions until either an SSB is found or all frequency positions are scanned. In some examples, the UE 115-c may select either the first or second synchronization raster grids to search initially based on a priority associated with the synchronization raster grids. For example, the UE 115-c may determine (e.g., based on a pre-configuration, signaling received from the base station 105-b, etc.) that the first synchronization raster grid has a higher priority than the second synchronization raster grid. Accordingly, the UE 115-c may search the first synchronization raster gird before searching the second synchronization raster grid. Alternatively, the UE 115-c may determine that the second synchronization raster grid has a higher priority than the first synchronization raster grid and select a grid to search accordingly.

A 320, the UE 115-d may detect an SSB transmitted by the base station 105-b at a frequency position defined in the first synchronization raster grid. At 330, the UE 115-d may communicate with the base station 105-b in response to receiving an SSB at a frequency position in the first synchronization raster grid.

At 325, the UE 115-c may fail to detect an SSB at one or more frequency positions in the first raster grid. In some examples, the UE 115-c may fail to detect an SSB on the first synchronization raster grid due to an obstruction in a path or channel between the UE 115-c and the base station 105-b.

At 335, the UE 115-c, in response to failing to detect an SSB on the first synchronization raster grid, may scan one or more frequency positions in the second synchronization raster grid. At 340, the UE 115-c may detect an SSB transmitted by the base station 105-b at a frequency position in the second synchronization raster grid. In some examples, the UE 115-c may detect an SSB on the first synchronization raster grid. In such examples, the UE 115-c may refrain from scanning frequency positions in the second synchronization raster grid.

At 345, the UE 115-c may communicate with the base station 105-b in response to receiving an SSB. Implementing aspects of the process flow 300 may allow a wireless communications system to support initial access procedures for UEs 115 that support using RISs and UEs 115 that do not support using RISs.

Figure 4:
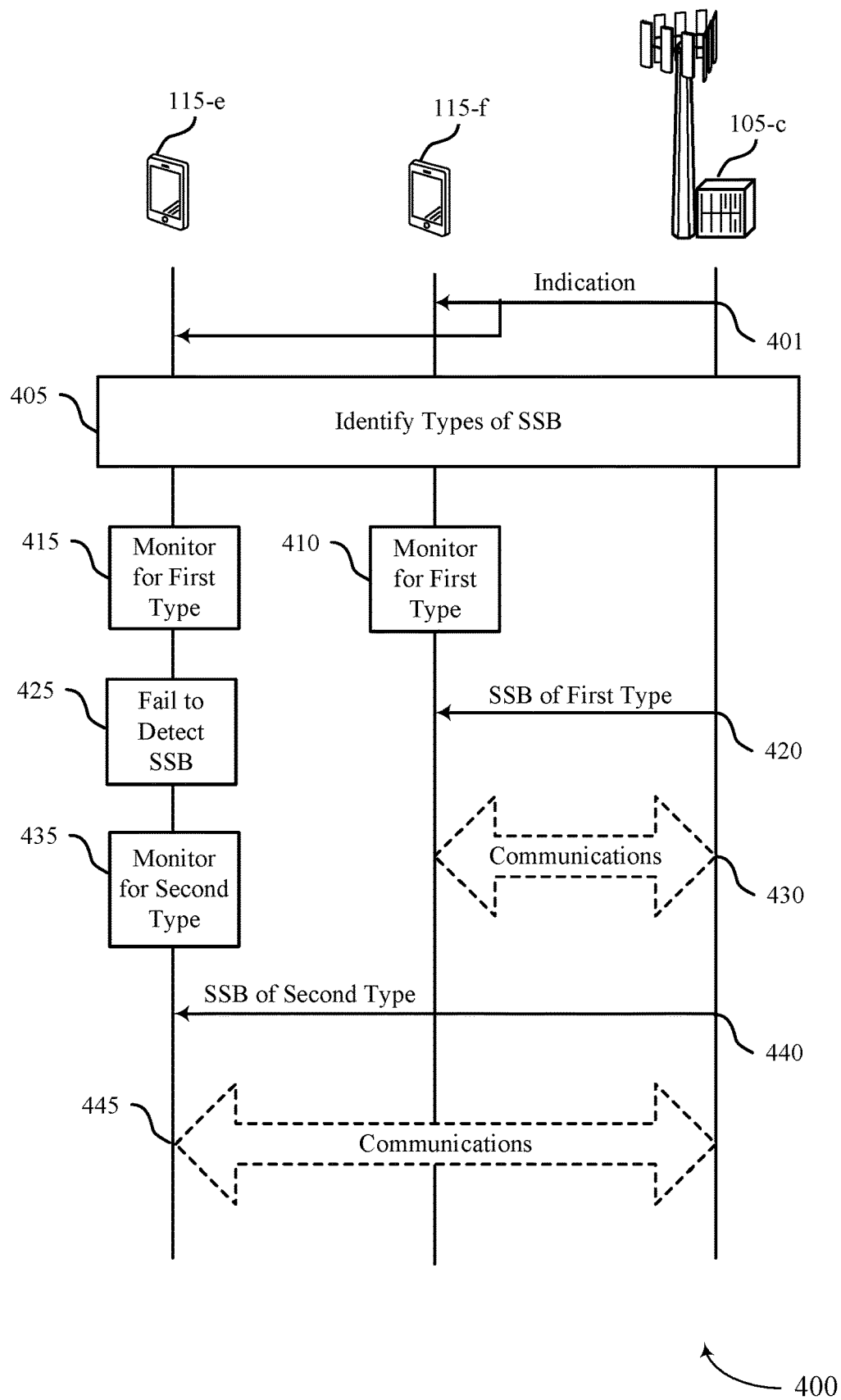
FIG. 4 illustrates an example of a process flow that supports transmitting one or more synchronization signal blocks via one or more reconfigurable intelligent surfaces in accordance with aspects of the present disclosure.

FIG. 4 illustrates an example of a process flow 400 that supports transmitting one or more SSBs via one or more RISs in accordance with one or more aspects of the present disclosure. In some examples, the process flow 400 may be implemented by or may implement aspects of the wireless communications system 100 or 200, the process flow 300, or any combination thereof as described with reference to FIGS. 1-3. The process flow 400 may include a UE 115-e, a UE 115-f, and a base station 105-c, which may be examples of the corresponding devices as described herein. In some examples, the UE 115-e may experience an obstructed path or channel between the UE 115-e and the base station 105-c and the UE 115-f may experience an unobstructed path or channel between the UE 115-f and the base station 105-c. Accordingly, the UE 115-c may be an example of a UE 115 that supports using an RIS for communication with the base station 105-b. Similarly, the UE 115-d may be an example of a UE 115 (e.g., a legacy UE 115) that does not support using an RIS. Alternative examples of the following may be implemented where some processes are performed in a different order than described or not performed at all. In some implementations, processes may include additional features not mentioned below, or further processes may be added.

In some examples, at 401, the base station 105-c may transmit an indication to the UE 115-e or the UE 115-f (or both) indicating a type of SSB to use. For example, the base station 105-c may transmit an indication to the UE 115-e or the UE 115-f (or both) indicating the UEs 115 to search for an SSB of a first or second type. The UE 115-e of the UE 115-f (or both) may determine a type of SSB to monitor a synchronization raster grid for based on receiving the indication. In some implementations, the base station 105-c may transmit the indication in an MIB. For example, the base station 105-c may use one or more bits in an MIB to indicate a type of SSB in which one value may indicate a first type of SSB and a different value may indicate a second type of SSB.

At 405, the UE 115-e, the UE 115-f, and the base station 105-c may identify a first type of SSB and a second type of SSB for use in initial access procedures. In some implementations, the first type of SSB (i.e., Type 0) may be used by UEs 115 that experience an unobstructed path or channel between the UEs 115 and a base station 105. Similarly, the second type of SSB (i.e., Type 1) may be used by UEs 115 that may use an RIS to establish a connection with a base station 105 in the presence of an obstructed path or channel between the UEs 115 and the base station 105. In some implementations, the UE 115-c may be capable to use both the first and second types of SSB, but the UE 115-d may capable to use only the first type of SSB. In some implementations, the first and second types of SSB may differ in a location (i.e., in a time or frequency location), order, etc. of synchronization or reference signals associated with an SSB. In some implementations, the first and second types of SSB may be transmitted (e.g., broadcast) by a base station 105 using a same synchronization raster grid.

At 410, the UE 115-f may scan (e.g., monitor) frequency positions on a synchronization raster grid for an SSB of the first type. Similarly, at 415, the UE 115-e may scan the synchronization raster grid for an SSB of the first type. In some examples, the UE 115-e or the UE 115-d (or both) may search some or all frequency positions in the synchronization raster grid for an SSB of the first type. For example, the UE 115-e or the UE 115-d (or both) may search a subset of frequency positions in the raster grid based on a pattern or may search each frequency position until either an SSB is found or all frequency positions are scanned. In some implementations, the UE 115-e may search all frequency positions in the synchronization raster grid for an SSB of the first type before searching for an SSB of the second type. Alternatively, the UE 115-e may search each frequency position for both an SSB of the first type and an SSB of the second type (if the UE 115-e does not detect an SSB of the first type). In some examples, the UE 115-e may select a type of SSB to search for initially based on priorities associated with the first and second types of SSB. For example, the UE 115-e may determine (e.g., based on a pre-configuration signaling received from the base station 105-c, etc.) that the first type of SSB has a higher priority than the second type of SSB and so may search for an SSB of the first type before searching for an SSB of the second type. Alternatively, the UE 115-e may determine that the second type of SSB has a higher priority than the first type of SSB and select a type of SSB to search for accordingly.

At 420, the UE 115-f may detect an SSB of the first type transmitted by the base station 105-c. At 430, the UE 115-f may communicate with the base station 105-c in response to receiving an SSB of the first type.

At 425, the UE 115-e may fail to detect an SSB of the first type due to experiencing an obstructed channel between the UE 115-e and the base station 105-c. At 435, the UE 115-e, in response to failing to detect an SSB of the first type, may search frequency positions in the synchronization raster grid for an SSB of the second type. In some implementations, the UE 115-e may search at least a subset of, if not all, frequency positions in the synchronization raster grid for an SSB of the first type before searching for an SSB of the second type. In some implementations, the UE 115-e may search a frequency position in the synchronization raster grid for both an SSB of the first type and an SSB of the second type before searching other frequency positions in the synchronization raster grid.

At 440, the UE 115-e may detect an SSB of the second type transmitted by the base station 105-c in the synchronization raster grid. At 445, the UE 115-e may communicate with the base station 105-c in response to receiving the SSB of the second type. Implementing aspects of the process flow 400 may allow a wireless communications system to support initial access procedures for UEs 115 that support using RISs and UEs 115 that do not support using RISs.

Figure 5B:
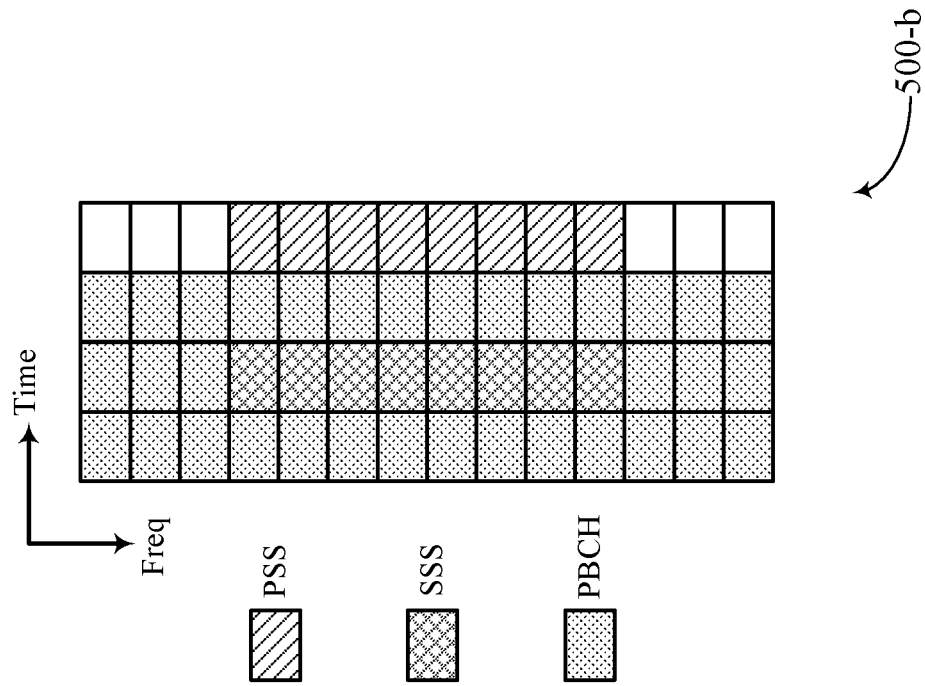
FIGS. 5A-B illustrates an example of a resource mapping scheme that supports transmitting one or more synchronization signal blocks via one or more reconfigurable intelligent surfaces in accordance with aspects of the present disclosure.
Figure 5A:
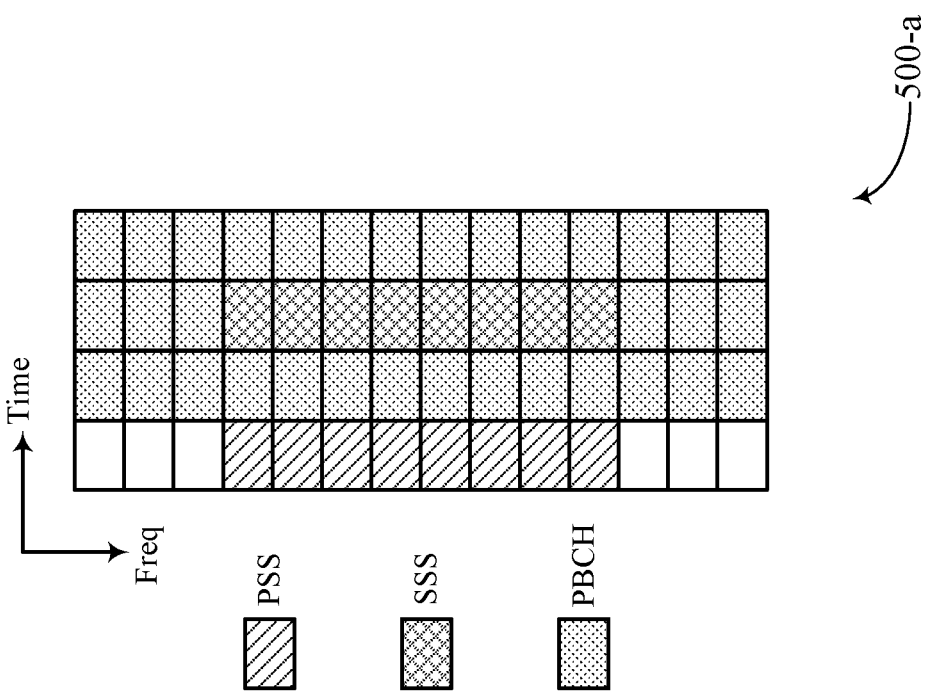

FIG. 5A and FIG. 5B illustrate example resource mapping schemes 500-a and 500-b that support transmitting one or more SSBs via one or more RISs in accordance with one or more aspects of the present disclosure. In some examples, the resource mapping schemes 500-a and 500-b may be implemented by or may implement aspects of the wireless communications system 100 or 200, the process flow 300 or 400, or any combination thereof as described with reference to FIGS. 1-4. In some examples, the resource mapping schemes 500-a and 500-b may be implemented by UEs 115, base stations 105, or any combination thereof.

The example of FIG. 5A illustrates a resource mapping scheme 500-a which may correspond to a first type of SSB (i.e., a Type 0 SSB). In the example of FIG. 5A, a PSS may be mapped to resource elements located earlier in time than resource elements associated with a PBCH DMRS, an SSS, etc.

The example of FIG. 5B illustrates a resource mapping scheme 500-b which may correspond to a second type of SSB (i.e., a Type 1 SSB). In the example of FIG. 5B, a PSS may be mapped to resource elements located later in time than resource elements associated with a PBCH DMRS, an SSS, etc. Thus, in some implementations, a Type 0 SSB may be distinguished from a Type 1 SSB based on a location of a PSS associated with the SSBs. For example, any combination of UEs 115 or base stations 105 may identify the first and second types of SSB based on determining locations (e.g., time locations) of a PSS in each type of SSB.

In some examples, such as those in which a wireless communications system uses RISs, a base station 105 may transmit one or both types of SSB to UEs 115. A UE 115 which does not support using an RIS (e.g., a legacy UE) may search for and receive an SSB of the first type. A UE 115 which supports using an RIS or is using an RIS may search for and receive an SSB of the second type. Accordingly, each type of UE 115 may receive an SSB based on a capability of the UE 115 and may determine whether an RIS is being used based on the type of SSB the UE 115 receives.

Figure 6B:
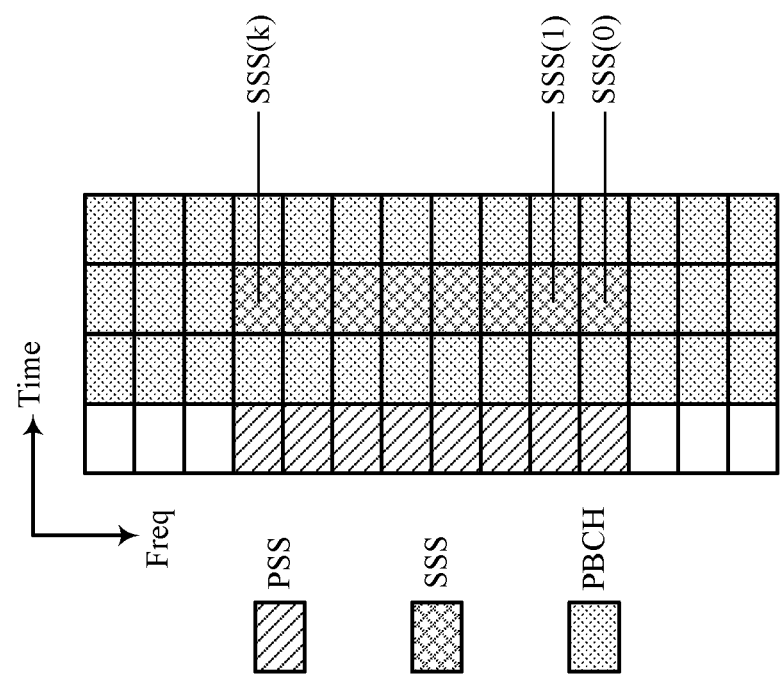
FIG. 6A-B illustrates an example of a resource mapping scheme that supports transmitting one or more synchronization signal blocks via one or more reconfigurable intelligent surfaces in accordance with aspects of the present disclosure.
Figure 6A:
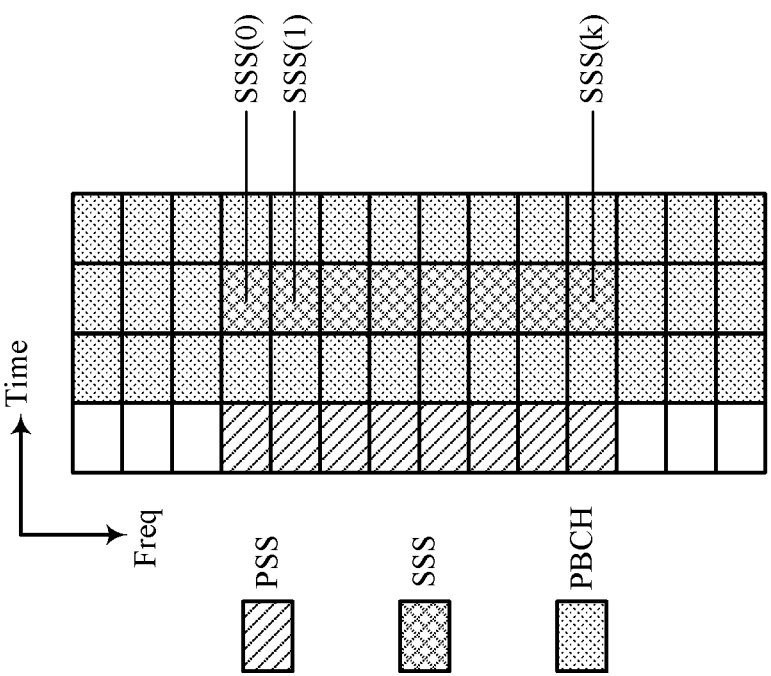

FIG. 6A and FIG. 6B illustrate example resource mapping schemes 600-*a* and 600-*b* that support transmitting one or more SSBs via one or more RISs in accordance with one or more aspects of the present disclosure. In some examples, the resource mapping schemes 600-*a* and 600-*b* may be implemented by or may implement aspects of the wireless communications system 100 or 200, the process flows 300 or 400, resource mapping schemes 500-*a* or 500-*b*, or any combination thereof as described with reference to FIGS. 1-5. In some examples, the resource mapping schemes 600-*a* and 600-*b* may be implemented by UEs 115, base stations 105, or any combination thereof. In some implementations, a sequence associated with an SSS may be scaled and mapped on to time/frequency resources.

The example of FIG. 6A illustrates a resource mapping scheme 600-*a* which may correspond to a first type of SSB (i.e., a Type 0 SSB). In the example of FIG. 6A, an SSS associated with an SSB may be mapped onto resource elements using a first mapping order. For example, a sequence associated with the SSS may be mapped onto resource elements in order of increasing frequency.

The example of FIG. 6B illustrates a resource mapping scheme 600-*b* which may correspond to a second type of SSB (i.e., a Type 1 SSB). In the example of FIG. 6B, an SSS associated with an SSB may be mapped onto resource elements using a second mapping order. For example, a sequence associated with the SSS may be mapped onto resource elements in order of decreasing frequency. Although described with respect to orders of increasing or decreasing frequency, the first and second mapping orders may include additional mapping orders (e.g., other mapping directions) or patterns (e.g., alternating, repeating, etc.). In some implementations, a Type 0 SSB may be distinguished from a Type 1 SSB based on a mapping order of an SSS associated with the SSBs. For example, any combination of UEs 115 or base stations 105 may identify the first and second types of SSB based on determining mapping orders of an SSS in each type of SSB.

In some examples, such as those in which a wireless communications system uses one or more RISs, a base station 105 may transmit one or both types of SSB to UEs 115. A UE 115 which does not support using an RIS (e.g., a legacy UE) may search for and receive an SSB of the first type. A UE 115 which supports using an RIS or is using an RIS may search for and receive an SSB of the second type. Accordingly, each type of UE 115 may receive an SSB based on a capability of the UE 115 and may determine whether an RIS is being used based on the type of SSB the UE 115 receives.

Figure 7B:
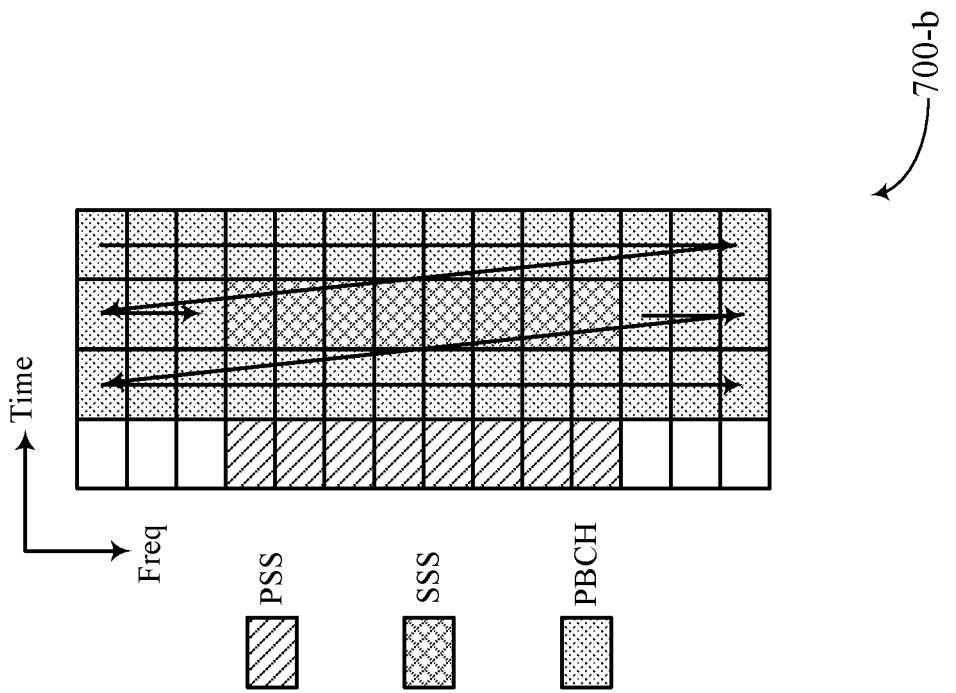
FIG. 7A-B illustrates an example of a resource mapping scheme that supports transmitting one or more synchronization signal blocks via one or more reconfigurable intelligent surfaces in accordance with aspects of the present disclosure.
Figure 7A:
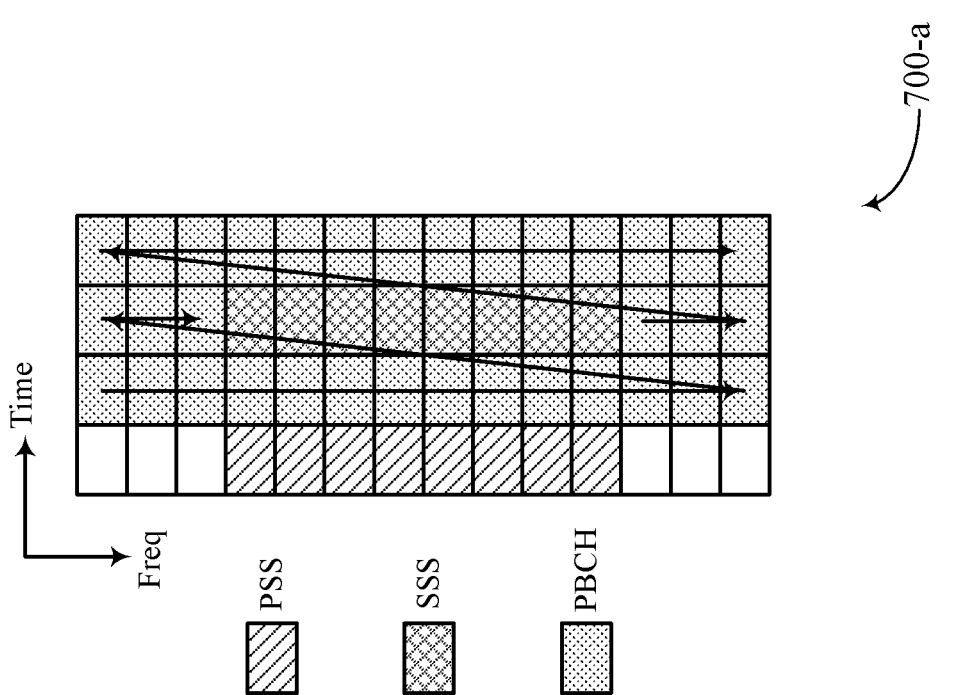

FIG. 7A and FIG. 7B illustrate example resource mapping schemes 700-*a* and 700-*b* that support transmitting one or more SSBs via one or more RISs in accordance with one or more aspects of the present disclosure. In some examples, the resource mapping schemes 700-*a* and 700-*b* may be implemented by or may implement aspects of the wireless communications system 100 or 200, the process flows 300 or 400, resource mapping schemes 500-*a*, 500-*b*, 600-*a*, or 600-*b*, or any combination thereof as described with reference to FIGS. 1-6. In some examples, the resource mapping schemes 700-*a* and 700-*b* may be implemented by UEs 115, base stations 105, or any combination thereof. In some implementations, a sequence associated with a DMRS for PBCH transmissions may be scaled to conform to PBCH power allocation and mapped on to time/frequency resources in order of increasing frequency.

The example of FIG. 7A illustrates a resource mapping scheme 700-*a* which may correspond to a first type of SSB (i.e., a Type 0 SSB). In the example of FIG. 7A, a DMRS for PBCH transmission may be mapped onto resource elements using a first mapping order. For example, a sequence associated with the DMRS may be mapped onto resource elements in order of increasing frequency and increasing time.

The example of FIG. 7B illustrates a resource mapping scheme 700-*b* which may correspond to a second type of SSB (i.e., a Type 1 SSB). In the example of FIG. 7B, a DMRS for PBCH transmission may be mapped onto resource elements using a second mapping order. For example, a sequence associated with the DMRS may be mapped onto resource elements in order of increasing frequency and decreasing time. Although described with respect to an order of increasing or decreasing time, the first and second mapping orders may include additional mapping orders (e.g., other mapping directions) or patterns (e.g., alternating, repeating, etc.). In some implementations, a Type 0 SSB may be distinguished from a Type 1 SSB based on a mapping order of a DMRS associated with the SSBs. For example, any combination of UEs 115 or base stations 105 may identify the first and second types of SSB based on determining mapping orders of a DMRS in each type of SSB.

In some examples, such as those in which a wireless communications system uses one or more RISs, a base station 105 may transmit one or both types of SSB to UEs 115. A UE 115 which does not support using an RIS (e.g., a legacy UE) may search for and receive an SSB of the first type. A UE 115 which supports using an RIS or is using an RIS may search for and receive an SSB of the second type. Accordingly, each type of UE 115 may receive an SSB based on a capability of the UE 115 and may determine whether an RIS is being used based on the type of SSB the UE 115 receives.

Figure 8:
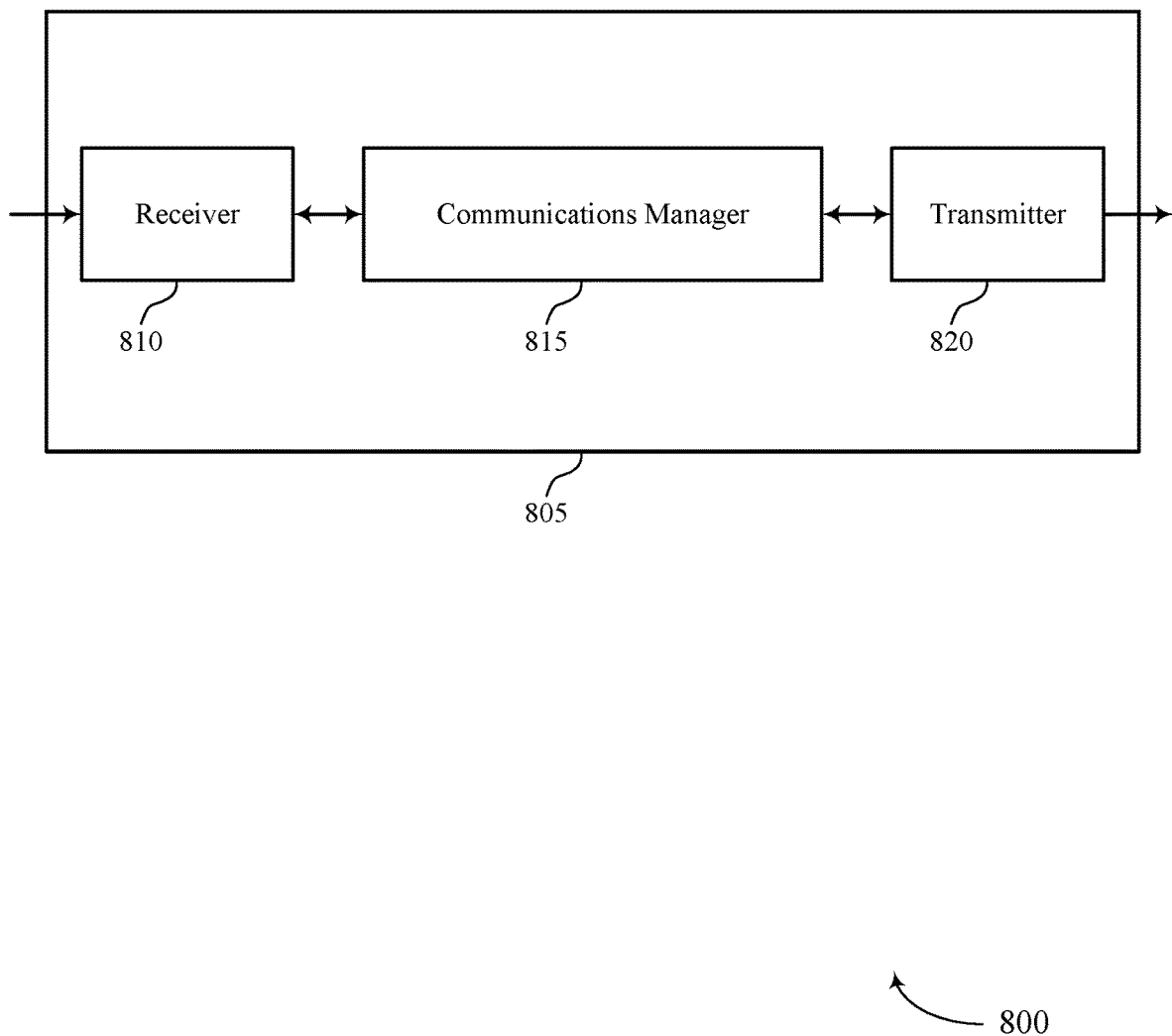
FIGS. 8 and 9 show block diagrams of devices that support transmitting one or more synchronization signal blocks via one or more reconfigurable intelligent surfaces in accordance with aspects of the present disclosure.

FIG. 8 shows a block diagram 800 of a device 805 that supports transmitting one or more SSBs via one or more RISs in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to transmitting SSB via RISs, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a first synchronization raster grid and a second synchronization raster grid for use by the UE to receive one or more SSBs, the second synchronization raster grid including frequency positions associated with a RIS, monitor one or more resource elements for the one or more SSBs based on one or more of the first synchronization raster grid or the second synchronization raster grid, and receive at least one SSB based on monitoring the one or more resource elements. The communications manager 815 may also identify a first type of SSB and a second type of SSB that are associated with a same synchronization raster grid and are for receiving by the UE, where the second type of SSB is associated with a RIS, monitor one or more resource elements for the one or more SSBs including one or more of the first type of SSB or the second type of SSB, and receive at least one SSB of the first type or the second type based on monitoring the one or more REs. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 may be implemented as an integrated circuit or chipset for a mobile device modem, and the receiver 810 and transmitter 820 may be implemented as analog components (e.g., amplifier, filters, antennas) coupled with the mobile device modem to enable wireless transmission and reception over one or more bands.

The communications manager 815 as described may be implemented to realize one or more potential advantages. One implementation may allow the device 805 to receive SSBs according to a capability of the device 805. Based on the techniques for receiving SSBs, the device 805 may support obtaining accurate channel information for a channel between the device 805 and another device. As such, the device 805 may exhibit improved reliability, improved data reliability, and reduced latency, among other benefits.

Figure 9:
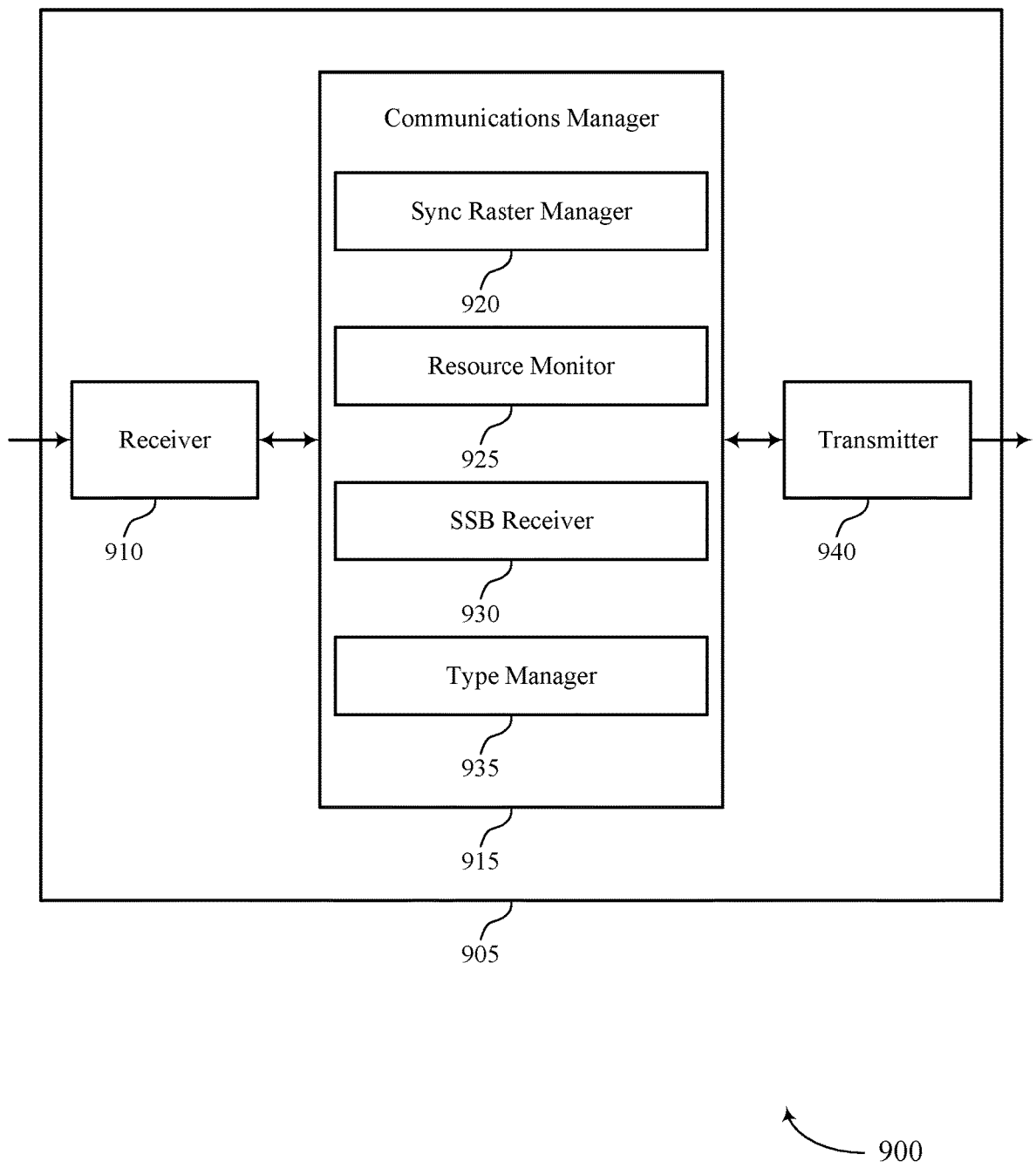

FIG. 9 shows a block diagram 900 of a device 905 that supports transmitting one or more SSBs via one or more RISs in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to transmitting SSB via RISs, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a synchronization raster manager 920, a resource monitor 925, a SSB receiver 930, and a type manager 935. The communications manager 915 may be an example of aspects of the communications manager 1110 described herein.

The synchronization raster manager 920 may identify a first synchronization raster grid and a second synchronization raster grid for use by the UE to receive one or more SSBs, the second synchronization raster grid including frequency positions associated with an RIS.

The resource monitor 925 may monitor one or more resource elements for the one or more SSBs based on one or more of the first synchronization raster grid or the second synchronization raster grid.

The SSB receiver 930 may receive at least one SSB based on monitoring the one or more resource elements.

The type manager 935 may identify a first type of SSB and a second type of SSB that are associated with a same synchronization raster grid and are for receiving by the UE, where the second type of SSB is associated with an RIS.

The resource monitor 925 may monitor one or more resource elements for the one or more SSBs including one or more of the first type of SSB or the second type of SSB.

The SSB receiver 930 may receive at least one SSB of the first type or the second type based on monitoring the one or more REs.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
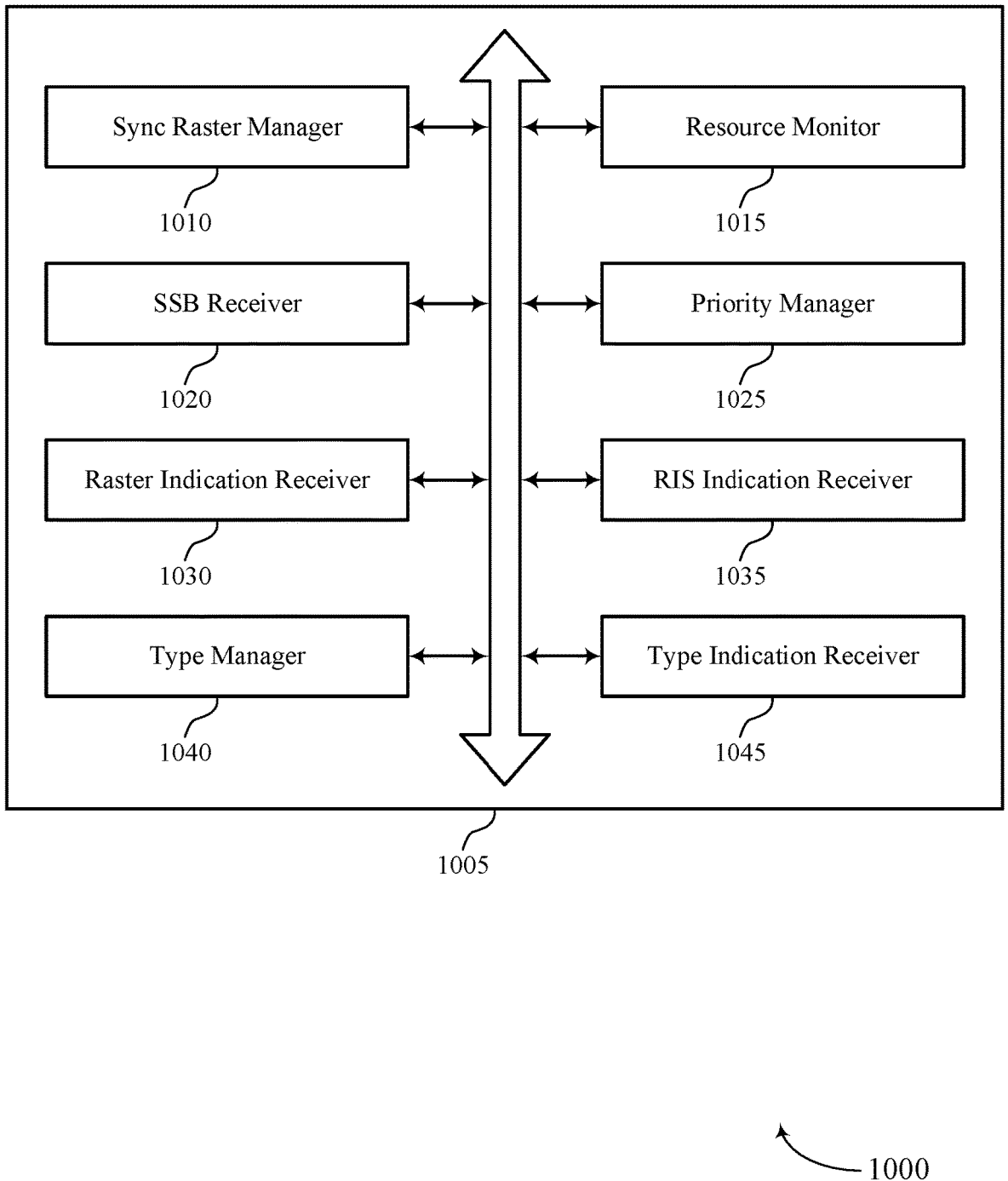
FIG. 10 shows a block diagram of a communications manager that supports transmitting one or more synchronization signal blocks via one or more reconfigurable intelligent surfaces in accordance with aspects of the present disclosure.

FIG. 10 shows a block diagram 1000 of a communications manager 1005 that supports transmitting one or more SSBs via one or more RISs in accordance with aspects of the present disclosure. The communications manager 1005 may be an example of aspects of a communications manager 815, a communications manager 915, or a communications manager 1110 described herein. The communications manager 1005 may include a synchronization raster manager 1010, a resource monitor 1015, a SSB receiver 1020, a priority manager 1025, a raster indication receiver 1030, an RIS indication receiver 1035, a type manager 1040, and a type indication receiver 1045. Each of these modules may communicate, directly or indirectly, with one another (e.g., via one or more buses).

The synchronization raster manager 1010 may identify a first synchronization raster grid and a second synchronization raster grid for use by the UE to receive one or more SSBs, the second synchronization raster grid including frequency positions associated with an RIS. In some examples, the synchronization raster manager 1010 may identify a first set of frequency positions in the first synchronization raster grid and a second set of frequency positions in the second synchronization raster grid that are non-overlapping with the first set of frequency positions in the first synchronization raster grid.

The resource monitor 1015 may monitor one or more resource elements for the one or more SSBs based on one or more of the first synchronization raster grid or the second synchronization raster grid.

In some examples, the resource monitor 1015 may monitor one or more resource elements for the one or more SSBs including one or more of the first type of SSB or the second type of SSB.

In some examples, the resource monitor 1015 may scan one or more frequency positions in the first synchronization raster grid for the one or more SSBs. In some examples, the resource monitor 1015 may fail to detect the one or more SSBs at the one or more frequency positions in the first synchronization raster grid. In some examples, the resource monitor 1015 may scan one or more frequency positions in the second synchronization raster grid for the one or more SSBs, where receiving the at least one SSB is based on scanning the one or more frequency positions in the second synchronization raster grid.

In some examples, the resource monitor 1015 may scan one or more frequency positions in the first synchronization raster grid for the one or more SSBs, where receiving the at least one SSB is based on scanning the one or more frequency positions in the first synchronization raster grid.

In some examples, the resource monitor 1015 may refrain from scanning one or more frequency positions in the second synchronization raster grid based on receiving the at least one SSB at the one or more frequency positions in the first synchronization raster grid.

In some examples, the resource monitor 1015 may scan a first frequency position in the synchronization raster grid for an SSB of the first type. In some examples, the resource monitor 1015 may fail to detect an SSB of the first type at the first frequency position. In some examples, the resource monitor 1015 may scan a first frequency position in the synchronization raster grid for a SSB of the second type, where receiving at least the one SSB includes receiving a SSB of the second type based on scanning the first frequency position.

In some examples, the resource monitor 1015 may scan each frequency position in the synchronization raster grid for an SSB of the first type. In some examples, the resource monitor 1015 may fail to detect an SSB of the first type at each frequency position in the synchronization raster grid.

In some examples, the resource monitor 1015 may scan one or more frequency positions in the synchronization raster for a SSB of the second type, where receiving at least the one SSB includes receiving a SSB of the second type based on scanning the one or more frequency positions.

In some examples, the resource monitor 1015 may scan at least one frequency position in the synchronization raster grid for a SSB of the first type, where receiving at least the one SSB includes receiving a SSB of the first type based on scanning at least the one frequency position.

The SSB receiver 1020 may receive at least one SSB based on monitoring the one or more resource elements. In some examples, the SSB receiver 1020 may receive at least one SSB of the first type or the second type based on monitoring the one or more REs.

The type manager 1040 may identify a first type of SSB and a second type of SSB that are associated with a same synchronization raster grid and are for receiving by the UE, where the second type of SSB is associated with an RIS.

In some examples, the type manager 1040 may identify a first location of a primary synchronization signal associated with the first type of SSB and a second location of a primary synchronization signal associated with the second type of SSB. In some examples, the type manager 1040 may identify a first time location of a primary synchronization signal associated with the first type of SSB and a second time location of a primary synchronization signal associated with the second type of SSB.

In some examples, the type manager 1040 may identify a first mapping order of a secondary synchronization signal associated with the first type of SSB and a second mapping order of a secondary synchronization signal associated with the second type of SSB.

In some examples, the type manager 1040 may identify a first increasing mapping order of a secondary synchronization signal associated with the first type of SSB and a second decreasing mapping order of a secondary synchronization signal associated with the second type of SSB.

In some examples, the type manager 1040 may identify a first decreasing mapping order of a secondary synchronization signal associated with the first type of SSB and a second increasing mapping order of a secondary synchronization signal associated with the second type of SSB.

In some examples, the type manager 1040 may identify a first mapping order of a demodulation reference signal associated with the first type of SSB and a second mapping order of a demodulation reference signal associated with the second type of SSB.

In some examples, the type manager 1040 may identify a first increasing mapping order of a demodulation reference signal associated with the first type of SSB and a second decreasing mapping order of a demodulation reference signal associated with the second type of SSB.

In some examples, the type manager 1040 may identify a first decreasing mapping order of a demodulation reference signal associated with the first type of SSB and a second increasing mapping order of a demodulation reference signal associated with the second type of SSB.

In some cases, the first mapping order and the second mapping order each include an order for mapping a sequence of symbols associated with a secondary synchronization signal onto one or more resource elements. In some cases, the first mapping order and the second mapping order each include an order for mapping a sequence of symbols associated with a demodulation reference signal onto one or more resource elements.

In some examples, the Priority Manager 1025 may determine that a priority associated with the first type of SSB is different than a priority associated with the second type of SSB, where monitoring the one or more resource elements is based on the determining. In some examples, the Priority Manager 1025 may determine that the priority associated with the first type of SSB is higher than the priority associated with the priority associated with the second type of SSB. In some examples, the Priority Manager 1025 may determine that the priority associated with the first type of SSB is lower than the priority associated with the priority associated with the second type of SSB.

The raster indication receiver 1030 may receive, from a base station, an indication of one of the first synchronization raster grid or the second synchronization raster grid that the UE is to use for receiving the one or more SSBs, where monitoring the one or more resource elements is based on receiving the indication.

The RIS indication receiver 1035 may receive, from the base station, an indication that the second synchronization raster grid is associated with the RIS, where the UE uses one or both of the first synchronization raster grid or the second synchronization raster grid based on receiving the indication that the second synchronization raster grid is associated with the RIS and whether the UE is capable of interacting with the RIS.

The type indication receiver 1045 may receive, from a base station, an indication of one of the first type of SSB or the second type of SSB, where monitoring the one or more resource elements is based on receiving the indication. In some examples, the Type Indication Receiver 1045 may receive a master information block from a base station including the indication.

Figure 11:
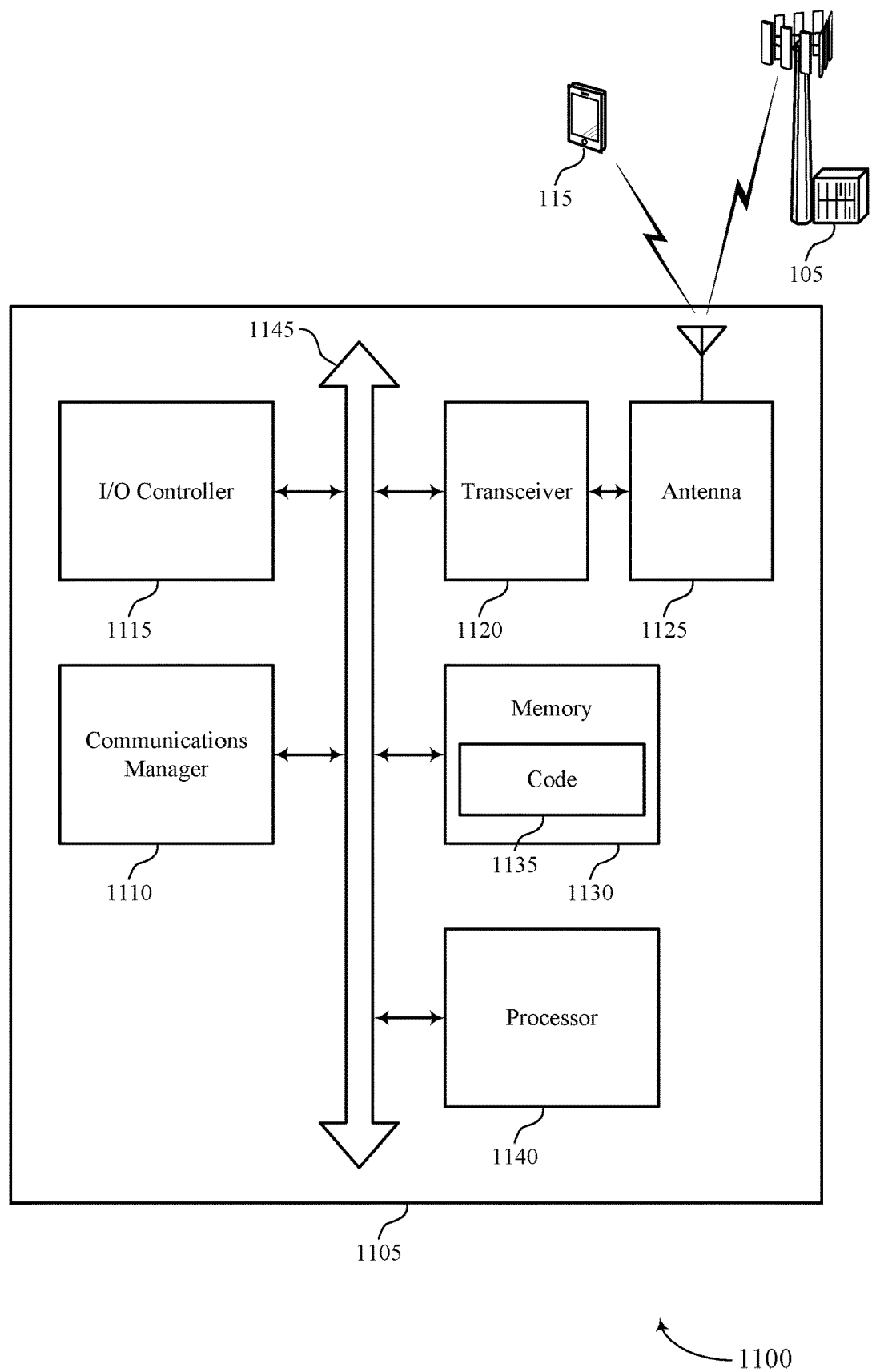
FIG. 11 shows a diagram of a system including a device that supports transmitting one or more synchronization signal blocks via one or more reconfigurable intelligent surfaces in accordance with aspects of the present disclosure.

FIG. 11 shows a diagram of a system 1100 including a device 1105 that supports transmitting one or more SSBs via one or more RISs in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a first synchronization raster grid and a second synchronization raster grid for use by the UE to receive one or more SSBs, the second synchronization raster grid including frequency positions associated with a RIS, monitor one or more resource elements for the one or more SSBs based on one or more of the first synchronization raster grid or the second synchronization raster grid, and receive at least one SSB based on monitoring the one or more resource elements. The communications manager 1110 may also identify a first type of SSB and a second type of SSB that are associated with a same synchronization raster grid and are for receiving by the UE, where the second type of SSB is associated with a RIS, monitor one or more resource elements for the one or more SSBs including one or more of the first type of SSB or the second type of SSB, and receive at least one SSB of the first type or the second type based on monitoring the one or more REs.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting transmitting SSB via RISs).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
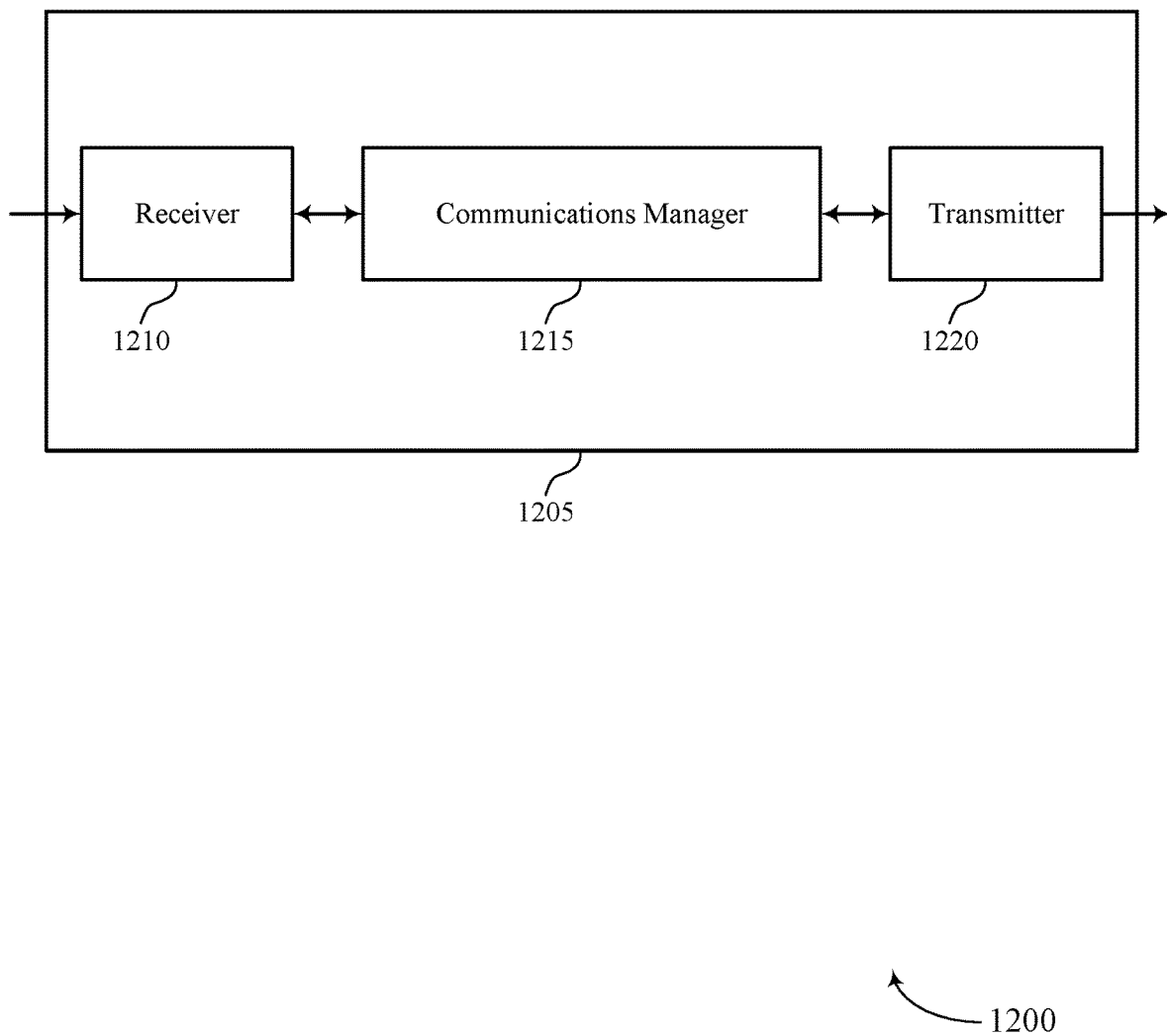
FIGS. 12 and 13 show block diagrams of devices that support transmitting one or more synchronization signal blocks via one or more reconfigurable intelligent surfaces in accordance with aspects of the present disclosure.

FIG. 12 shows a block diagram 1200 of a device 1205 that supports transmitting one or more SSBs via one or more RISs in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to transmitting SSB via RISs, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a first synchronization raster grid and a second synchronization raster grid for use by the base station to transmit one or more SSBs, the second synchronization raster grid including frequency positions associated with a RIS, configure one or more resource elements for transmitting the one or more SSBs based on the first synchronization raster grid and second synchronization raster grid, and transmit the one or more SSBs using the one or more configured REs. The communications manager 1215 may also identify a first type of SSB and a second type of SSB that are associated with a same synchronization raster grid and for transmitting by the base station, where the second type of SSB is associated with a reconfiguration intelligent surface, configure one or more resource elements for transmitting the one or more SSBs including one or more of the first type of SSB or the second type of SSB, and transmit the one or more SSBs using the one or more configured resource elements. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
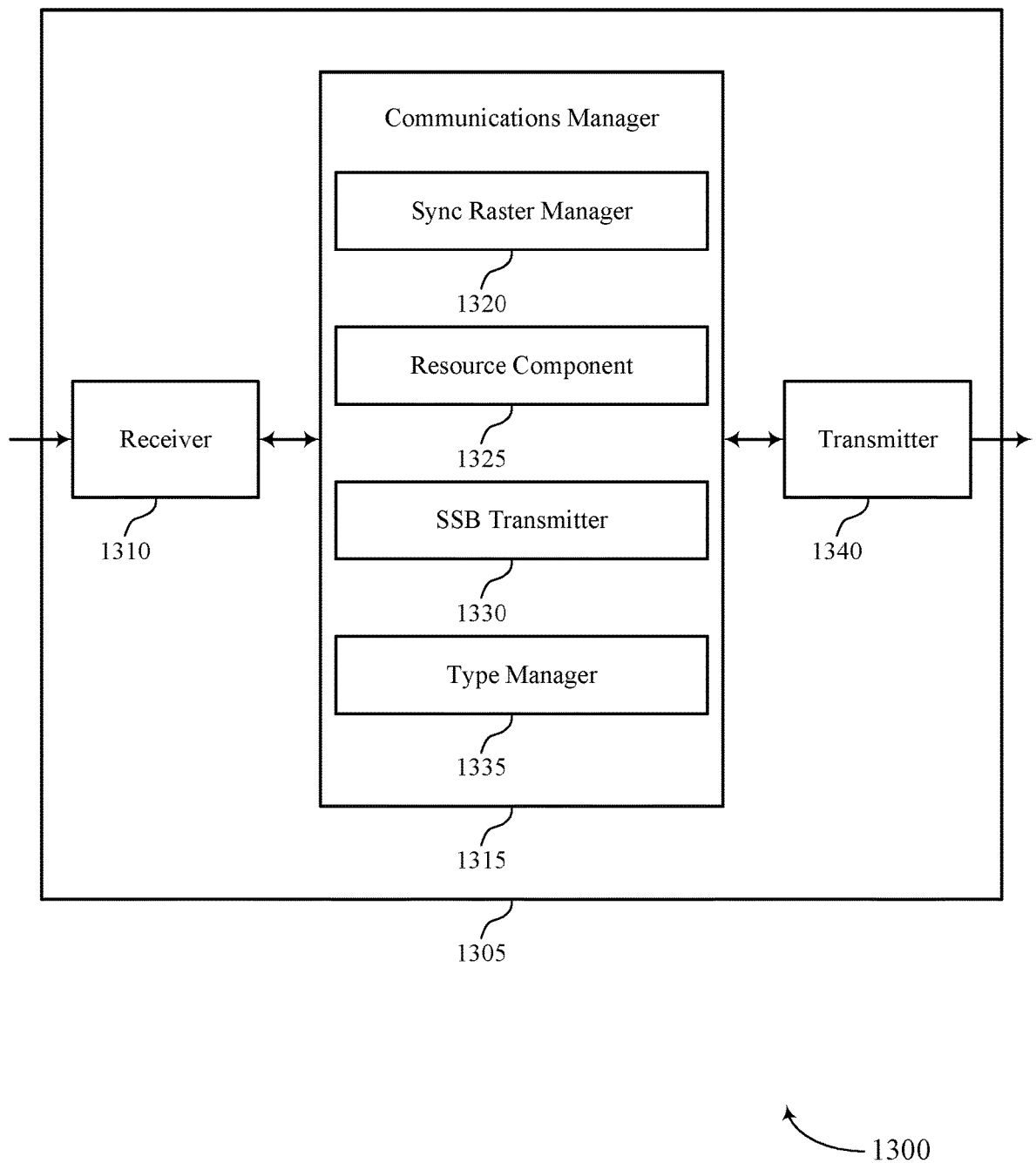

FIG. 13 shows a block diagram 1300 of a device 1305 that supports transmitting one or more SSBs via one or more RISs in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to transmitting SSB via RISs, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a synchronization raster manager 1320, a resource component 1325, a SSB transmitter 1330, and a type manager 1335. The communications manager 1315 may be an example of aspects of the communications manager 1510 described herein.

The synchronization raster manager 1320 may identify a first synchronization raster grid and a second synchronization raster grid for use by the base station to transmit one or more SSBs, the second synchronization raster grid including frequency positions associated with an RIS.

The resource component 1325 may configure one or more resource elements for transmitting the one or more SSBs based on the first synchronization raster grid and second synchronization raster grid.

The SSB transmitter 1330 may transmit the one or more SSBs using the one or more configured REs.

The type manager 1335 may identify a first type of SSB and a second type of SSB that are associated with a same synchronization raster grid and for transmitting by the base station, where the second type of SSB is associated with a reconfiguration intelligent surface.

The resource component 1325 may configure one or more resource elements for transmitting the one or more SSBs including one or more of the first type of SSB or the second type of SSB.

The SSB transmitter 1330 may transmit the one or more SSBs using the one or more configured resource elements.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
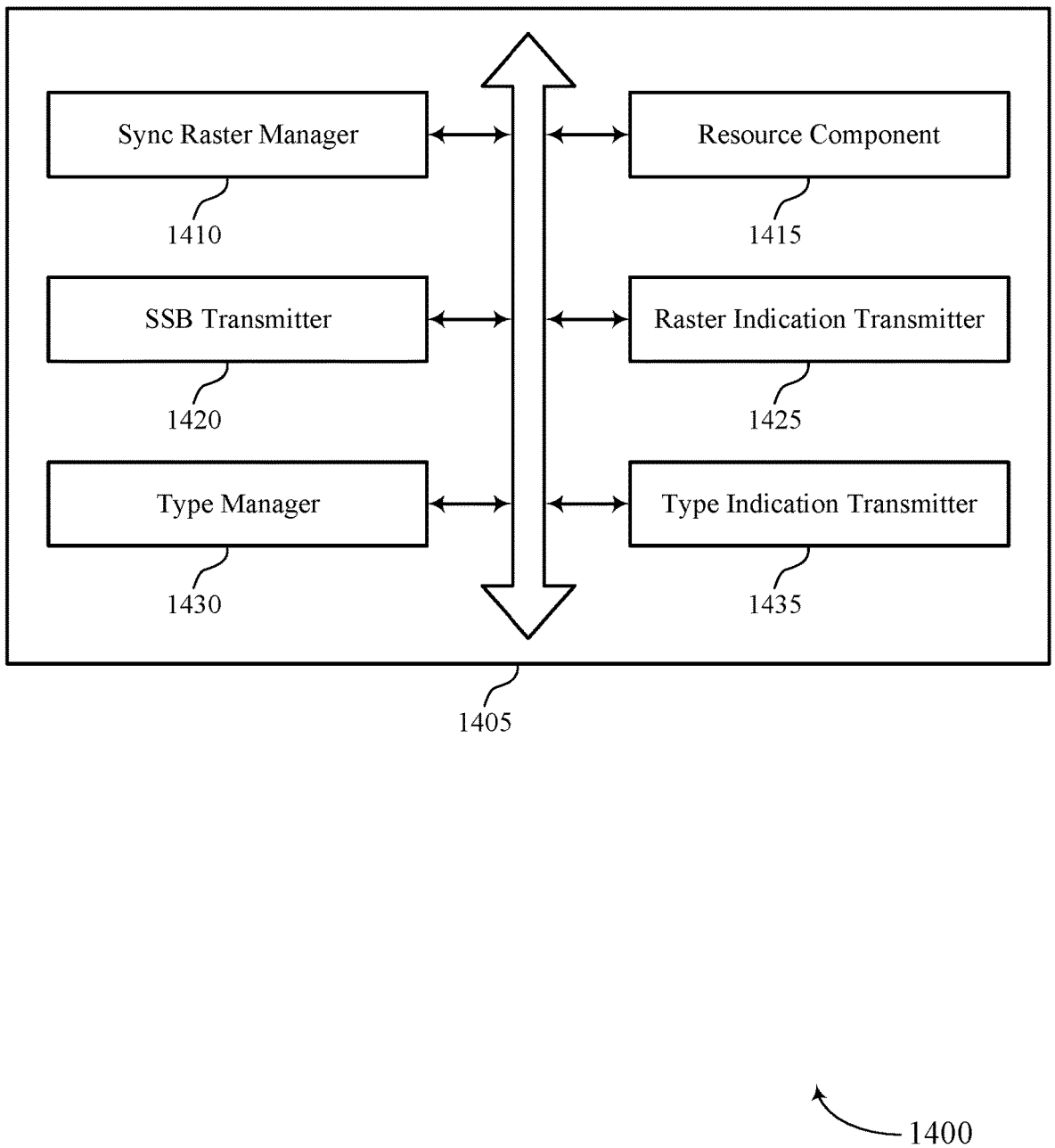
FIG. 14 shows a block diagram of a communications manager that supports transmitting one or more synchronization signal blocks via one or more reconfigurable intelligent surfaces in accordance with aspects of the present disclosure.

FIG. 14 shows a block diagram 1400 of a communications manager 1405 that supports transmitting one or more SSBs via one or more RISs in accordance with aspects of the present disclosure. The communications manager 1405 may be an example of aspects of a communications manager 1215, a communications manager 1315, or a communications manager 1510 described herein. The communications manager 1405 may include a synchronization raster manager 1410, a resource component 1415, a SSB transmitter 1420, a raster indication transmitter 1425, a type manager 1430, and a type indication transmitter 1435. Each of these modules may communicate, directly or indirectly, with one another (e.g., via one or more buses).

The synchronization raster manager 1410 may identify a first synchronization raster grid and a second synchronization raster grid for use by the base station to transmit one or more SSBs, the second synchronization raster grid including frequency positions associated with an RIS. In some examples, the synchronization raster manager 1410 may identify a first set of frequency positions in the first synchronization raster grid and a second set of frequency positions in the second synchronization raster grid that are non-overlapping with the first set of frequency positions in the first synchronization raster grid.

The resource component 1415 may configure one or more resource elements for transmitting the one or more SSBs based on the first synchronization raster grid and second synchronization raster grid. In some examples, the resource component 1415 may configure one or more resource elements for transmitting the one or more SSBs including one or more of the first type of SSB or the second type of SSB.

In some examples, the resource component 1415 may configure resource elements at one or more frequency positions in the first synchronization raster grid. In some examples, the resource component 1415 may configure resource elements at one or more frequency positions in the second synchronization raster grid, where transmitting the one or more SSBs includes transmitting the one or more SSBs using the resource elements at the one or more frequency positions in the first synchronization raster grid and the resource elements at the one or more frequency positions in the second synchronization raster grid.

The SSB transmitter 1420 may transmit the one or more SSBs using the one or more configured REs.

The type manager 1430 may identify a first type of SSB and a second type of SSB that are associated with a same synchronization raster grid and for transmitting by the base station, where the second type of SSB is associated with a reconfiguration intelligent surface.

In some examples, the type manager 1430 may identify a first location of a primary synchronization signal associated with the first type of SSB and a second location of a primary synchronization signal associated with the second type of SSB. In some examples, the type manager 1430 may identify a first time location of a primary synchronization signal associated with the first type of SSB and a second time location of a primary synchronization signal associated with the second type of SSB.

In some examples, the type manager 1430 may identify a first mapping order of a secondary synchronization signal associated with the first type of SSB and a second first mapping order of a secondary synchronization signal associated with the second type of SSB. In some examples, the type manager 1430 may identify a first increasing mapping order of a secondary synchronization signal associated with the first type of SSB and a second decreasing mapping order of a secondary synchronization signal associated with the second type of SSB. In some examples, the type manager 1430 may identify a first decreasing mapping order of a secondary synchronization signal associated with the first type of SSB and a second increasing mapping order of a secondary synchronization signal associated with the second type of SSB.

In some examples, the type manager 1430 may identify a first mapping order of a demodulation reference signal associated with the first type of SSB and a second mapping order of a demodulation reference signal associated with the second type of SSB. In some examples, the type manager 1430 may identify a first increasing mapping order of a demodulation reference signal associated with the first type of SSB and a second decreasing mapping order of a demodulation reference signal associated with the second type of SSB. In some examples, the type manager 1430 may identify a first decreasing mapping order of a demodulation reference signal associated with the first type of SSB and a second increasing mapping order of a demodulation reference signal associated with the second type of SSB. In some cases, the first mapping order and the second mapping order each include an order for mapping a sequence of symbols associated with a secondary synchronization signal onto one or more resource elements.

The raster indication transmitter 1425 may transmit, to one or more UEs, an indication of one of the first synchronization raster grid or the second synchronization raster grid for the UEs to use for receiving the one or more SSBs, where configuring the one or more resource elements is based on the indication.

The type indication transmitter 1435 may transmit, to one or more UEs, an indication of one of the first type of SSB or the first type of SSB for which the UEs should monitor, where configuring the one or more resource elements is based on the indication. In some examples, the type indication transmitter 1435 may transmit a master information block including the indication.

Figure 15:
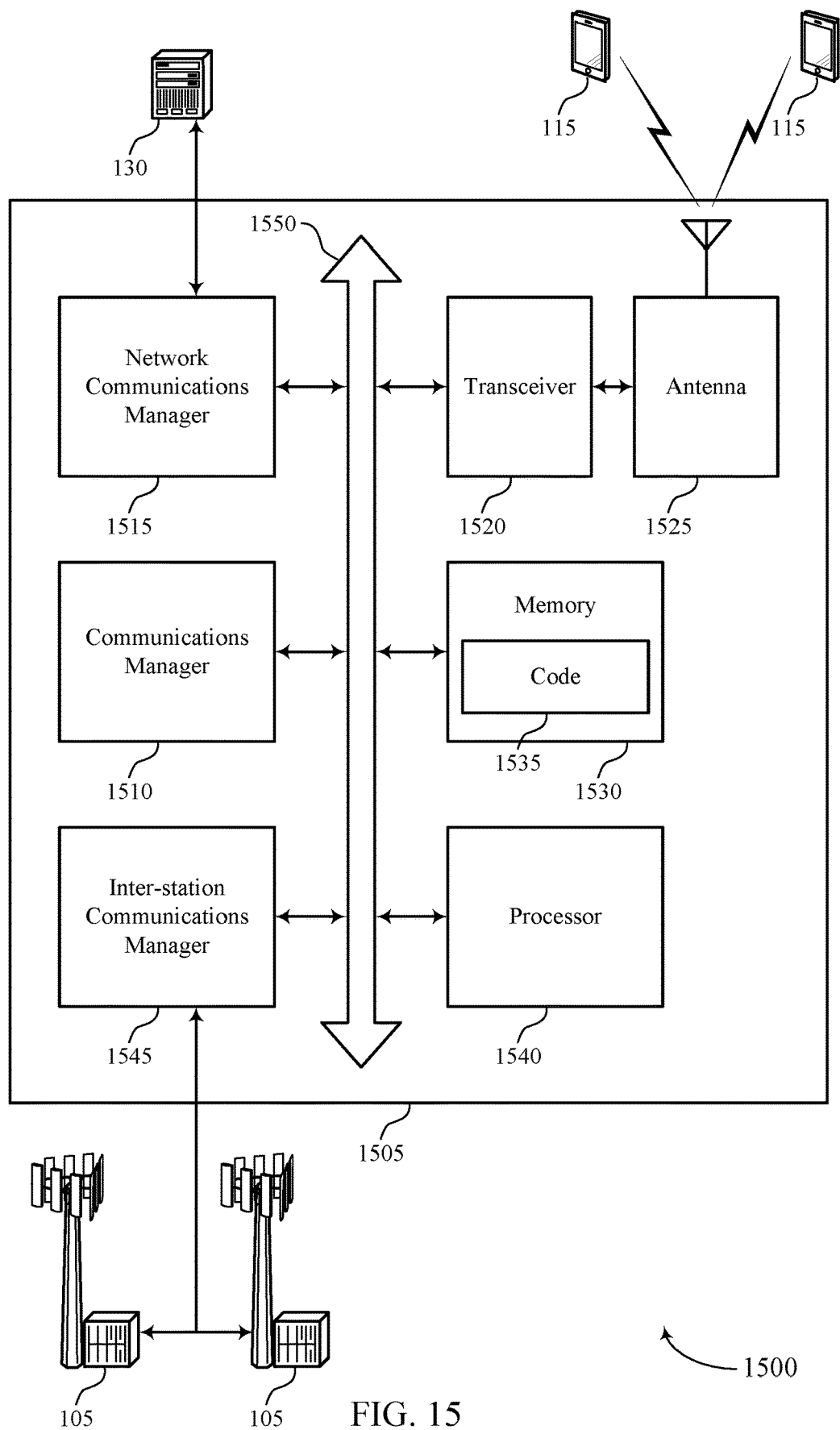
FIG. 15 shows a diagram of a system including a device that supports transmitting one or more synchronization signal blocks via one or more reconfigurable intelligent surfaces in accordance with aspects of the present disclosure.

FIG. 15 shows a diagram of a system 1500 including a device 1505 that supports transmitting one or more SSBs via one or more RISs in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a first synchronization raster grid and a second synchronization raster grid for use by the base station to transmit one or more SSBs, the second synchronization raster grid including frequency positions associated with a RIS, configure one or more resource elements for transmitting the one or more SSBs based on the first synchronization raster grid and second synchronization raster grid, and transmit the one or more SSBs using the one or more configured REs. The communications manager 1510 may also identify a first type of SSB and a second type of SSB that are associated with a same synchronization raster grid and for transmitting by the base station, where the second type of SSB is associated with a reconfiguration intelligent surface, configure one or more resource elements for transmitting the one or more SSBs including one or more of the first type of SSB or the second type of SSB, and transmit the one or more SSBs using the one or more configured resource elements.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting transmitting SSB via RISs).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
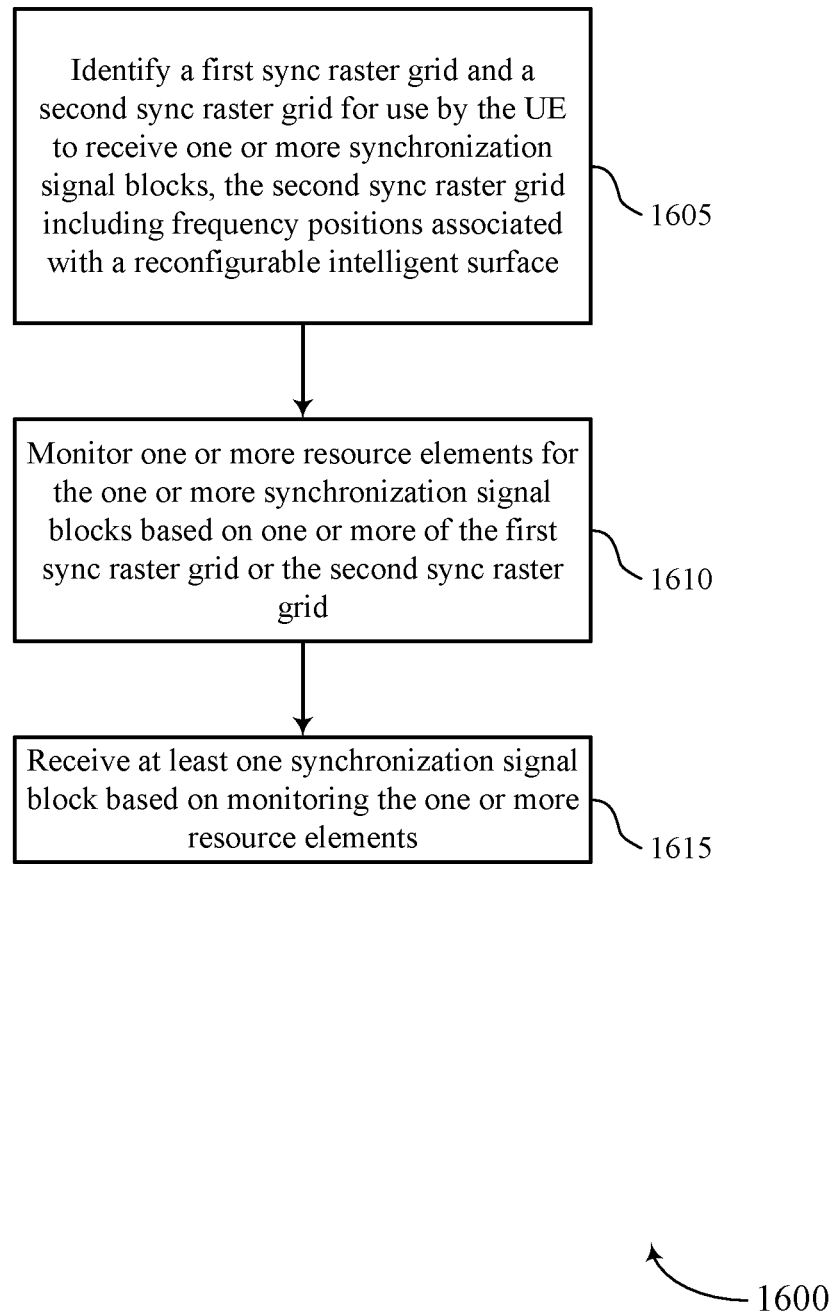
FIGS. 16 through 21 show flowcharts illustrating methods that support transmitting one or more synchronization signal blocks via one or more reconfigurable intelligent surfaces in accordance with aspects of the present disclosure.

FIG. 16 shows a flowchart illustrating a method 1600 that supports t transmitting one or more SSBs via one or more RISs in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a first synchronization raster grid and a second synchronization raster grid for use by the UE to receive one or more SSBs, the second synchronization raster grid including frequency positions associated with an RIS. The operations of 1605 may be performed according to the methods described herein. In some examples, aspects of the operations of 1605 may be performed by a synchronization raster manager as described with reference to FIGS. 8 through 11.

At 1610, the UE may monitor one or more resource elements for the one or more SSBs based on one or more of the first synchronization raster grid or the second synchronization raster grid. The operations of 1610 may be performed according to the methods described herein. In some examples, aspects of the operations of 1610 may be performed by a resource monitor as described with reference to FIGS. 8 through 11.

At 1615, the UE may receive at least one SSB based on monitoring the one or more resource elements. The operations of 1615 may be performed according to the methods described herein. In some examples, aspects of the operations of 1615 may be performed by an SSB receiver as described with reference to FIGS. 8 through 11.

Figure 17:
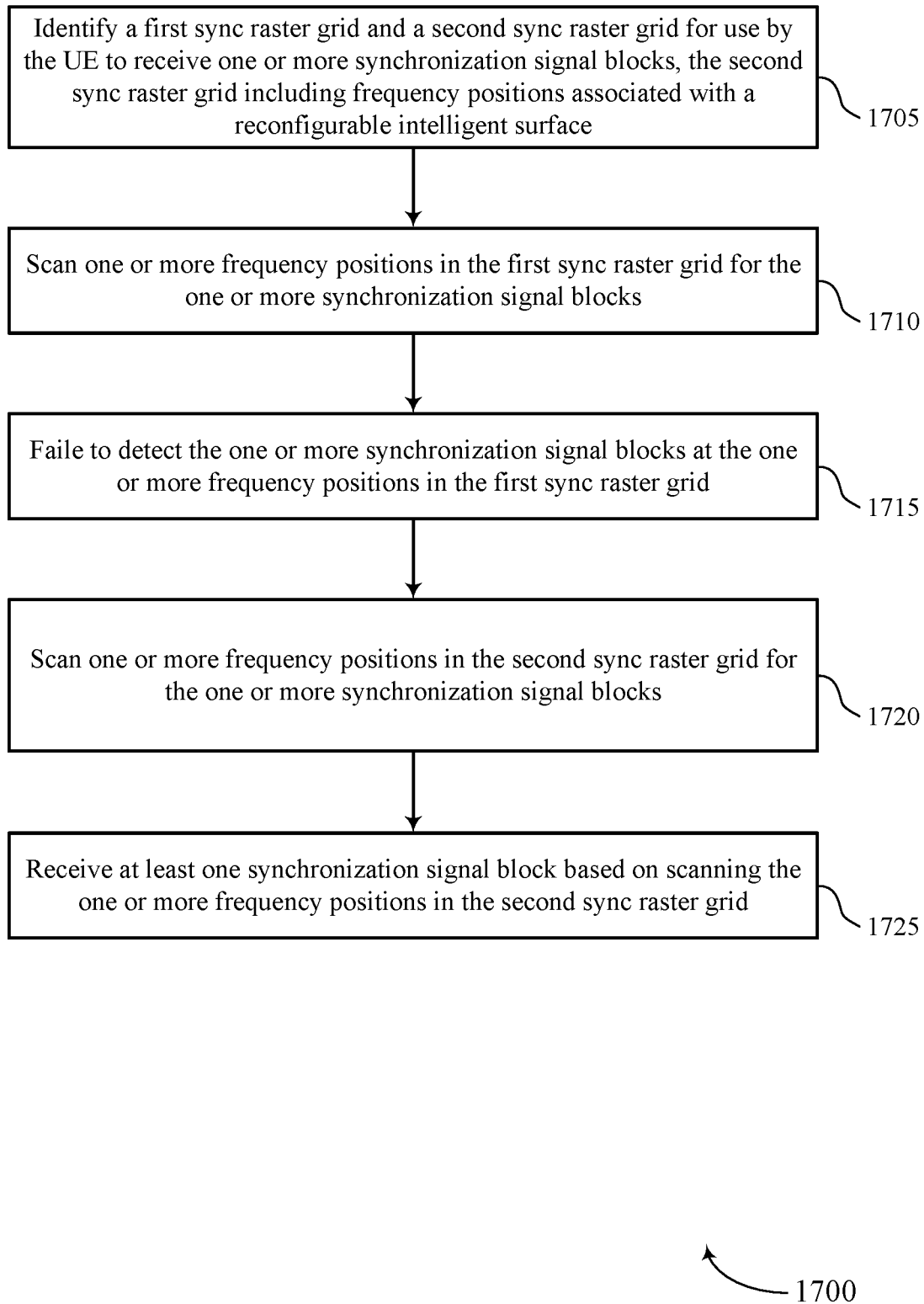

FIG. 17 shows a flowchart illustrating a method 1700 that supports transmitting one or more SSBs via one or more RISs in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may identify a first synchronization raster grid and a second synchronization raster grid for use by the UE to receive one or more SSBs, the second synchronization raster grid including frequency positions associated with an RIS. The operations of 1705 may be performed according to the methods described herein. In some examples, aspects of the operations of 1705 may be performed by a synchronization raster manager as described with reference to FIGS. 8 through 11.

At 1710, the UE may scan one or more frequency positions in the first synchronization raster grid for the one or more SSBs. The operations of 1710 may be performed according to the methods described herein. In some examples, aspects of the operations of 1710 may be performed by a resource monitor as described with reference to FIGS. 8 through 11.

At 1715, the UE may fail to detect the one or more SSBs at the one or more frequency positions in the first synchronization raster grid. The operations of 1715 may be performed according to the methods described herein. In some examples, aspects of the operations of 1715 may be performed by a resource monitor as described with reference to FIGS. 8 through 11.

At 1720, the UE may scan one or more frequency positions in the second synchronization raster grid for the one or more SSBs. The operations of 1720 may be performed according to the methods described herein. In some examples, aspects of the operations of 1720 may be performed by a resource monitor as described with reference to FIGS. 8 through 11.

At 1725, the UE may receive at least one SSB based on scanning the one or more frequency positions in the second synchronization raster grid. The operations of 1730 may be performed according to the methods described herein. In some examples, aspects of the operations of 1730 may be performed by an SSB receiver as described with reference to FIGS. 8 through 11.

Figure 18:
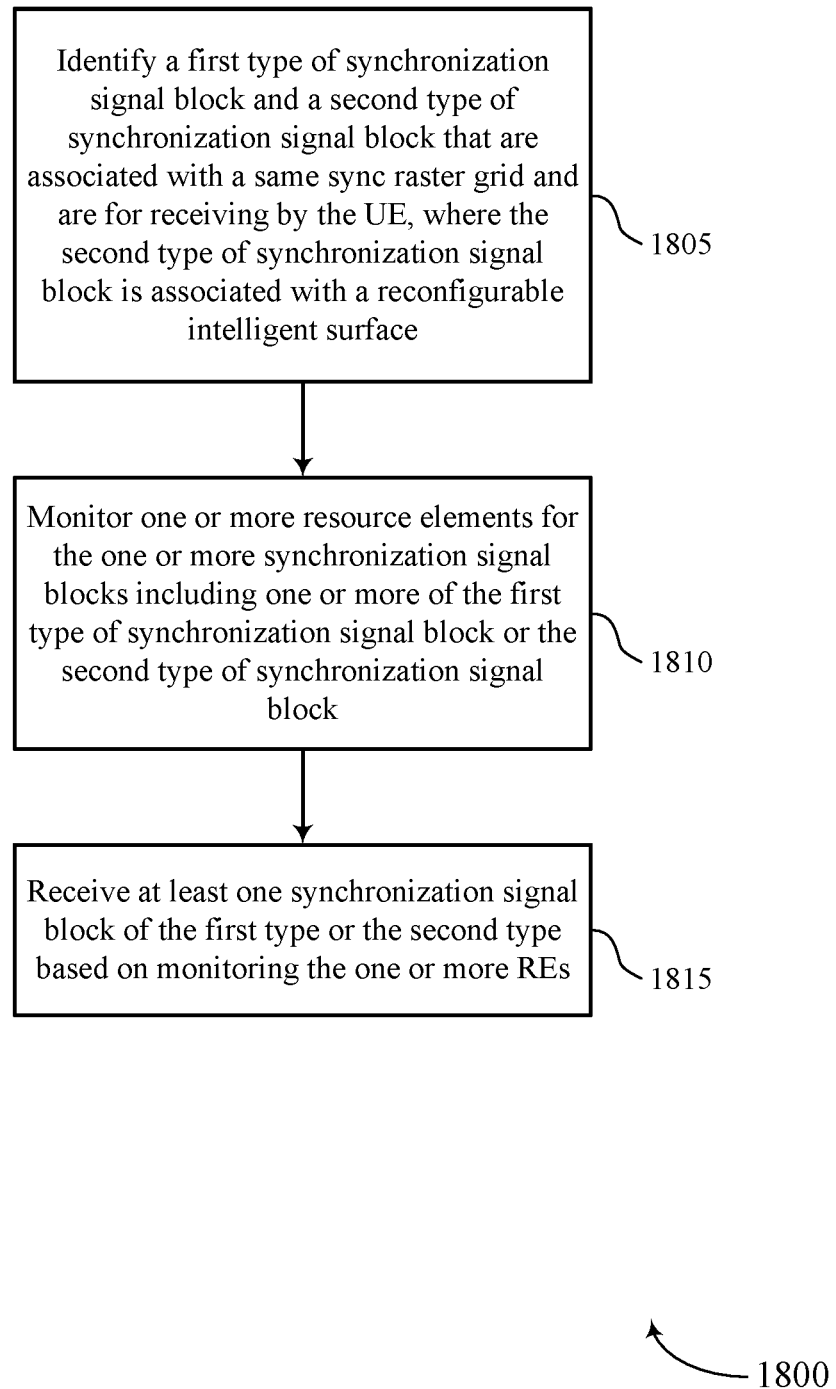

FIG. 18 shows a flowchart illustrating a method 1800 that supports transmitting one or more SSBs via one or more RISs in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may identify a first type of SSB and a second type of SSB that are associated with a same synchronization raster grid and are for receiving by the UE, where the second type of SSB is associated with an RIS. The operations of 1805 may be performed according to the methods described herein. In some examples, aspects of the operations of 1805 may be performed by a type manager as described with reference to FIGS. 8 through 11.

At 1810, the UE may monitor one or more resource elements for the one or more SSBs including one or more of the first type of SSB or the second type of SSB. The operations of 1810 may be performed according to the methods described herein. In some examples, aspects of the operations of 1810 may be performed by a resource monitor as described with reference to FIGS. 8 through 11.

At 1815, the UE may receive at least one SSB of the first type or the second type based on monitoring the one or more REs. The operations of 1815 may be performed according to the methods described herein. In some examples, aspects of the operations of 1815 may be performed by an SSB receiver as described with reference to FIGS. 8 through 11.

Figure 19:
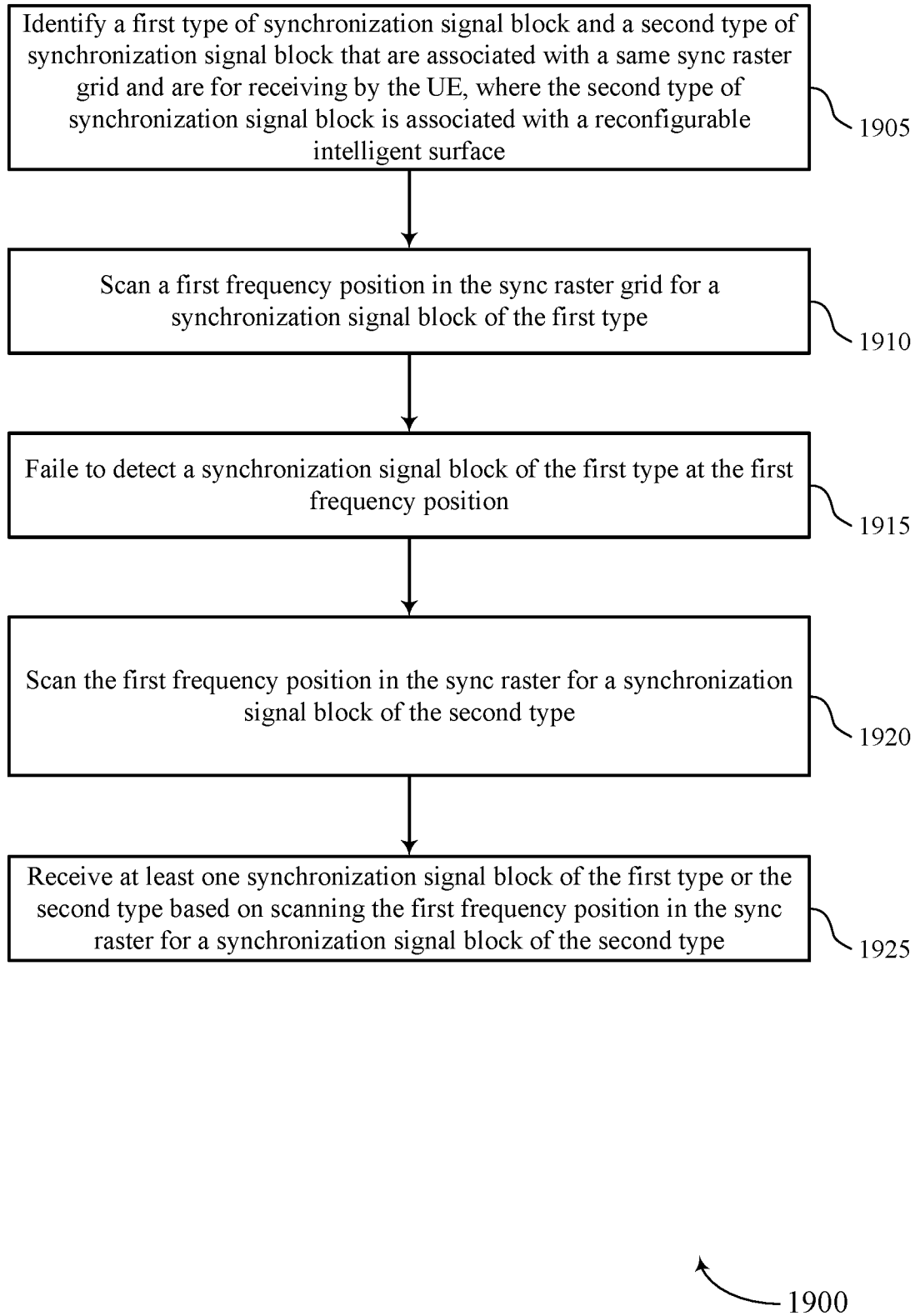

FIG. 19 shows a flowchart illustrating a method 1900 that supports transmitting one or more SSBs via one or more RISs in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may identify a first type of SSB and a second type of SSB that are associated with a same synchronization raster grid and are for receiving by the UE, where the second type of SSB is associated with an RIS. The operations of 1905 may be performed according to the methods described herein. In some examples, aspects of the operations of 1905 may be performed by a type manager as described with reference to FIGS. 8 through 11.

At 1910, the UE may scan a first frequency position in the synchronization raster grid for an SSB of the first type. The operations of 1910 may be performed according to the methods described herein. In some examples, aspects of the operations of 1910 may be performed by a resource monitor as described with reference to FIGS. 8 through 11.

At 1915, the UE may fail to detect an SSB of the first type at the first frequency position. The operations of 1915 may be performed according to the methods described herein. In some examples, aspects of the operations of 1915 may be performed by a resource monitor as described with reference to FIGS. 8 through 11.

At 1920, the UE may scan the first frequency position in the synchronization raster for an SSB of the second type. The operations of 1920 may be performed according to the methods described herein. In some examples, aspects of the operations of 1920 may be performed by a resource monitor as described with reference to FIGS. 8 through 11.

At 1925, the UE may receive at least one SSB of the first type or the second type based on scanning the first frequency position in the synchronization raster for a SSB of the second type. The operations of 1930 may be performed according to the methods described herein. In some examples, aspects of the operations of 1930 may be performed by an SSB receiver as described with reference to FIGS. 8 through 11.

Figure 20:
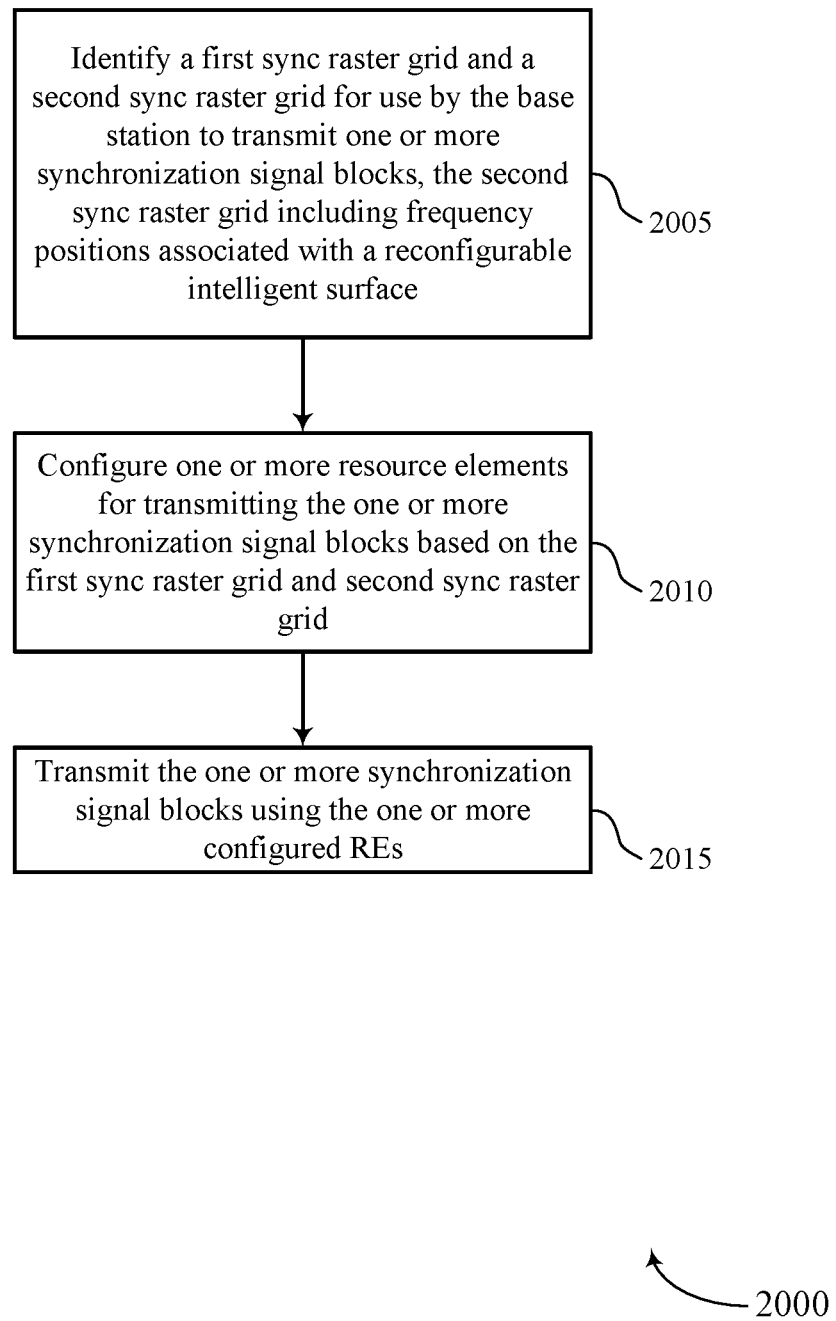

FIG. 20 shows a flowchart illustrating a method 2000 that supports transmitting one or more SSBs via one or more RISs in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may identify a first synchronization raster grid and a second synchronization raster grid for use by the base station to transmit one or more SSBs, the second synchronization raster grid including frequency positions associated with an RIS. The operations of 2005 may be performed according to the methods described herein. In some examples, aspects of the operations of 2005 may be performed by a synchronization raster manager as described with reference to FIGS. 12 through 15.

At 2010, the base station may configure one or more resource elements for transmitting the one or more SSBs based on the first synchronization raster grid and second synchronization raster grid. The operations of 2010 may be performed according to the methods described herein. In some examples, aspects of the operations of 2010 may be performed by a resource component as described with reference to FIGS. 12 through 15.

At 2015, the base station may transmit the one or more SSBs using the one or more configured REs. The operations of 2015 may be performed according to the methods described herein. In some examples, aspects of the operations of 2015 may be performed by an SSB Transmitter as described with reference to FIGS. 12 through 15.

Figure 21:
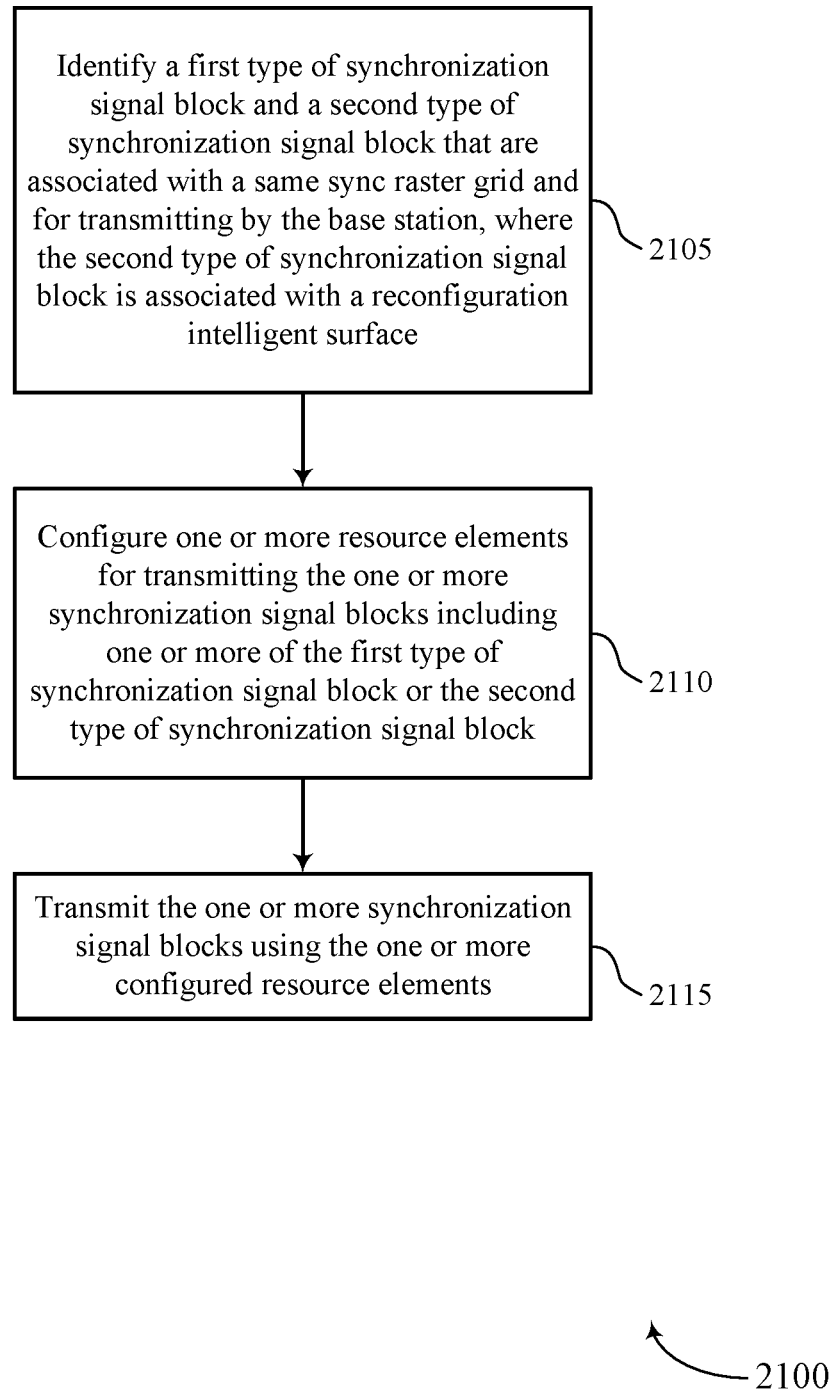

FIG. 21 shows a flowchart illustrating a method 2100 that supports transmitting one or more SSBs via one or more RISs in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may identify a first type of SSB and a second type of SSB that are associated with a same synchronization raster grid and for transmitting by the base station, where the second type of SSB is associated with a reconfiguration intelligent surface. The operations of 2105 may be performed according to the methods described herein. In some examples, aspects of the operations of 2105 may be performed by a type manager as described with reference to FIGS. 12 through 15.

At 2110, the base station may configure one or more resource elements for transmitting the one or more SSBs including one or more of the first type of SSB or the second type of SSB. The operations of 2110 may be performed according to the methods described herein. In some examples, aspects of the operations of 2110 may be performed by a resource component as described with reference to FIGS. 12 through 15.

At 2115, the base station may transmit the one or more SSBs using the one or more configured resource elements. The operations of 2115 may be performed according to the methods described herein. In some examples, aspects of the operations of 2115 may be performed by an SSB Transmitter as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   identifying a first synchronization raster grid and a second synchronization raster grid for use by the UE to receive one or more synchronization signal blocks, the second synchronization raster grid comprising frequency positions associated with a reconfigurable intelligent surface;
   monitoring one or more resource elements for the one or more synchronization signal blocks based at least in part on one or more of the first synchronization raster grid or the second synchronization raster grid; and
   receiving at least one synchronization signal block based at least in part on monitoring the one or more resource elements.

2. The method of claim 1, wherein monitoring the one or more resource elements comprises:
   scanning one or more frequency positions in the first synchronization raster grid for the one or more synchronization signal blocks;
   failing to detect the one or more synchronization signal blocks at the one or more frequency positions in the first synchronization raster grid; and
   scanning one or more frequency positions in the second synchronization raster grid for the one or more synchronization signal blocks, wherein receiving the at least one synchronization signal block is based at least in part on scanning the one or more frequency positions in the second synchronization raster grid.

3. The method of claim 1, wherein monitoring the one or more resource elements comprises:
   scanning one or more frequency positions in the first synchronization raster grid for the one or more synchronization signal blocks, wherein receiving the at least one synchronization signal block is based at least in part on scanning the one or more frequency positions in the first synchronization raster grid.

4. The method of claim 3, further comprising:
   refraining from scanning one or more frequency positions in the second synchronization raster grid based at least in part on receiving the at least one synchronization signal block at the one or more frequency positions in the first synchronization raster grid.

5. The method of claim 1, further comprising:
   determining that a priority associated with the first synchronization raster grid is different than a priority associated with the second synchronization raster grid, wherein monitoring the one or more resource elements is based at least in part on the determining.

6. The method of claim 5, wherein determining that the priority associated with the first synchronization raster grid is different than the priority associated with the second synchronization raster grid comprises:
   determining that the priority associated with the first synchronization raster grid is higher than the priority associated with the second synchronization raster grid.

7. The method of claim 5, wherein determining that the priority associated with the first synchronization raster grid is different than the priority associated with the second synchronization raster grid comprises:
   determining that the priority associated with the first synchronization raster grid is lower than the priority associated with the second synchronization raster grid.

8. The method of claim 1, further comprising:
   receiving, from a network device, an indication of one of the first synchronization raster grid or the second synchronization raster grid that the UE is to use for receiving the one or more synchronization signal blocks, wherein monitoring the one or more resource elements is based at least in part on receiving the indication.

9. The method of claim 1, further comprising:
   receiving, from a network device, an indication that the second synchronization raster grid is associated with the reconfigurable intelligent surface, wherein the UE uses one or both of the first synchronization raster grid or the second synchronization raster grid based at least in part on receiving the indication that the second synchronization raster grid is associated with the reconfigurable intelligent surface and whether the UE is capable of interacting with the reconfigurable intelligent surface.

10. The method of claim 1, wherein identifying the first synchronization raster grid and the second synchronization raster grid comprises:
    identifying a first set of frequency positions in the first synchronization raster grid and a second set of frequency positions in the second synchronization raster grid that are non-overlapping with the first set of frequency positions in the first synchronization raster grid.

11. An apparatus for wireless communications at a user equipment (UE), comprising:
    a processor,
    memory coupled with the processor; and
    instructions stored in the memory and executable by the processor to cause the apparatus to:
      identify a first synchronization raster grid and a second synchronization raster grid for use by the UE to receive one or more synchronization signal blocks, the second synchronization raster grid comprising frequency positions associated with a reconfigurable intelligent surface;
      monitor one or more resource elements for the one or more synchronization signal blocks based at least in part on one or more of the first synchronization raster grid or the second synchronization raster grid; and
      receive at least one synchronization signal block based at least in part on monitoring the one or more resource elements.

12. The apparatus of claim 11, wherein the instructions to monitor the one or more resource elements are executable by the processor to cause the apparatus to:
    scan one or more frequency positions in the first synchronization raster grid for the one or more synchronization signal blocks;
    fail to detect the one or more synchronization signal blocks at the one or more frequency positions in the first synchronization raster grid; and
    scan one or more frequency positions in the second synchronization raster grid for the one or more synchronization signal blocks, wherein receiving the at least one synchronization signal block is based at least in part on scanning the one or more frequency positions in the second synchronization raster grid.

13. The apparatus of claim 11, wherein the instructions to monitor the one or more resource elements are executable by the processor to cause the apparatus to:

scan one or more frequency positions in the first synchronization raster grid for the one or more synchronization signal blocks, wherein receiving the at least one synchronization signal block is based at least in part on scanning the one or more frequency positions in the first synchronization raster grid.

14. The apparatus of claim 13, wherein the instructions are further executable by the processor to cause the apparatus to:

refrain from scanning one or more frequency positions in the second synchronization raster grid based at least in part on receiving the at least one synchronization signal block at the one or more frequency positions in the first synchronization raster grid.

15. The apparatus of claim 11, wherein the instructions are further executable by the processor to cause the apparatus to:

determine that a priority associated with the first synchronization raster grid is different than a priority associated with the second synchronization raster grid, wherein monitoring the one or more resource elements is based at least in part on the determining.

16. The apparatus of claim 15, wherein the instructions to determine that the priority associated with the first synchronization raster grid is different than the priority associated with the second synchronization raster grid are executable by the processor to cause the apparatus to:

determine that the priority associated with the first synchronization raster grid is higher than the priority associated with the second synchronization raster grid.

17. The apparatus of claim 15, wherein the instructions to determine that the priority associated with the first synchronization raster grid is different than the priority associated with the second synchronization raster grid are executable by the processor to cause the apparatus to:

determine that the priority associated with the first synchronization raster grid is lower than the priority associated with the second synchronization raster grid.

18. The apparatus of claim 11, wherein the instructions are further executable by the processor to cause the apparatus to:

receive, from a network device, an indication of one of the first synchronization raster grid or the second synchronization raster grid that the UE is to use for receiving the one or more synchronization signal blocks, wherein monitoring the one or more resource elements is based at least in part on receiving the indication.

19. The apparatus of claim 11, wherein the instructions are further executable by the processor to cause the apparatus to:

receive, from the a network device, an indication that the second synchronization raster grid is associated with the reconfigurable intelligent surface, wherein the UE uses one or both of the first synchronization raster grid or the second synchronization raster grid based at least in part on receiving the indication that the second synchronization raster grid is associated with the reconfigurable intelligent surface and whether the UE is capable of interacting with the reconfigurable intelligent surface.

20. The apparatus of claim 11, wherein the instructions to identify the first synchronization raster grid and the second synchronization raster grid are executable by the processor to cause the apparatus to:

identify a first set of frequency positions in the first synchronization raster grid and a second set of frequency positions in the second synchronization raster grid that are non-overlapping with the first set of frequency positions in the first synchronization raster grid.

21. An apparatus for wireless communications at a user equipment (UE), comprising:

means for identifying a first synchronization raster grid and a second synchronization raster grid for use by the UE to receive one or more synchronization signal blocks, the second synchronization raster grid comprising frequency positions associated with a reconfigurable intelligent surface;

means for monitoring one or more resource elements for the one or more synchronization signal blocks based at least in part on one or more of the first synchronization raster grid or the second synchronization raster grid; and means for receiving at least one synchronization signal block based at least in part on monitoring the one or more resource elements.

22. The apparatus of claim 21, wherein the means for monitoring the one or more resource elements comprises:

means for scanning one or more frequency positions in the first synchronization raster grid for the one or more synchronization signal blocks;

means for failing to detect the one or more synchronization signal blocks at the one or more frequency positions in the first synchronization raster grid; and means for scanning one or more frequency positions in the second synchronization raster grid for the one or more synchronization signal blocks, wherein receiving the at least one synchronization signal block is based at least in part on scanning the one or more frequency positions in the second synchronization raster grid.

23. The apparatus of claim 21, wherein the means for monitoring the one or more resource elements comprises:

means for scanning one or more frequency positions in the first synchronization raster grid for the one or more synchronization signal blocks, wherein receiving the at least one synchronization signal block is based at least in part on scanning the one or more frequency positions in the first synchronization raster grid.

24. The apparatus of claim 21, further comprising:

means for determining that a priority associated with the first synchronization raster grid is different than a priority associated with the second synchronization raster grid, wherein monitoring the one or more resource elements is based at least in part on the determining.

25. The apparatus of claim 21, further comprising:

means for receiving, from a network device, an indication of one of the first synchronization raster grid or the second synchronization raster grid that the UE is to use for receiving the one or more synchronization signal blocks, wherein monitoring the one or more resource elements is based at least in part on receiving the indication.

26. A non-transitory computer-readable medium storing code for wireless communications at a user equipment (UE), the code comprising instructions executable by a processor to:

identify a first synchronization raster grid and a second synchronization raster grid for use by the UE to receive one or more synchronization signal blocks, the second synchronization raster grid comprising frequency positions associated with a reconfigurable intelligent surface;

monitor one or more resource elements for the one or more synchronization signal blocks based at least in part on one or more of the first synchronization raster grid or the second synchronization raster grid; and
receive at least one synchronization signal block based at least in part on monitoring the one or more resource elements.

27. The non-transitory computer-readable medium of claim 26, wherein the instructions to monitor the one or more resource elements are executable to:
scan one or more frequency positions in the first synchronization raster grid for the one or more synchronization signal blocks;
fail to detect the one or more synchronization signal blocks at the one or more frequency positions in the first synchronization raster grid; and
scan one or more frequency positions in the second synchronization raster grid for the one or more synchronization signal blocks, wherein receiving the at least one synchronization signal block is based at least in part on scanning the one or more frequency positions in the second synchronization raster grid.

28. The non-transitory computer-readable medium of claim 26, wherein the instructions to monitor the one or more resource elements are executable to:
scan one or more frequency positions in the first synchronization raster grid for the one or more synchronization signal blocks, wherein receiving the at least one synchronization signal block is based at least in part on scanning the one or more frequency positions in the first synchronization raster grid.

29. The non-transitory computer-readable medium of claim 26, wherein the instructions are further executable to:
determine that a priority associated with the first synchronization raster grid is different than a priority associated with the second synchronization raster grid, wherein monitoring the one or more resource elements is based at least in part on the determining.

30. The non-transitory computer-readable medium of claim 26, wherein the instructions are further executable to:
receive, from a network device, an indication of one of the first synchronization raster grid or the second synchronization raster grid that the UE is to use for receiving the one or more synchronization signal blocks, wherein monitoring the one or more resource elements is based at least in part on receiving the indication.

* * * * *